(12) United States Patent
Kim

(10) Patent No.: US 10,664,158 B2
(45) Date of Patent: May 26, 2020

(54) MOBILE TERMINAL AND METHOD FOR CONTROLLING THE SAME

(71) Applicant: LG ELECTRONICS INC., Seoul (KR)

(72) Inventor: Eunhye Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 213 days.

(21) Appl. No.: 15/490,726

(22) Filed: Apr. 18, 2017

(65) Prior Publication Data
US 2018/0081538 A1    Mar. 22, 2018

(30) Foreign Application Priority Data
Sep. 21, 2016   (KR) .................... 10-2016-0120697

(51) Int. Cl.
*G06F 3/0488* (2013.01)
*G06F 3/0481* (2013.01)
*G06F 3/0482* (2013.01)
*G06F 3/0484* (2013.01)

(52) U.S. Cl.
CPC ........ *G06F 3/04886* (2013.01); *G06F 3/0481* (2013.01); *G06F 3/0482* (2013.01); *G06F 3/04845* (2013.01); *G06F 3/04883* (2013.01); *G06F 2203/04803* (2013.01); *G06F 2203/04806* (2013.01); *G06F 2203/04808* (2013.01)

(58) Field of Classification Search
CPC . G06F 2203/04803; G06F 2203/04806; G06F 2203/04808; G06F 3/0481; G06F 3/0482; G06F 3/04845; G06F 3/04883; G06F 3/04886
See application file for complete search history.

(56) References Cited

U.S. PATENT DOCUMENTS

| | | | | |
|---|---|---|---|---|
| 2011/0075031 A1* | 3/2011 | Jung | ....................... | H04N 5/45 348/565 |
| 2011/0252381 A1* | 10/2011 | Chaudhri | ............ | G06F 3/04883 715/838 |
| 2012/0081313 A1* | 4/2012 | Sirpal | .................. | G06F 1/1616 345/173 |
| 2012/0258696 A1* | 10/2012 | Nam | ....................... | H04W 4/02 455/414.2 |
| 2013/0120295 A1* | 5/2013 | Kim | .......................... | G06F 3/01 345/173 |
| 2013/0305184 A1* | 11/2013 | Kim | ...................... | G06F 3/0481 715/781 |
| 2016/0349860 A1* | 12/2016 | Wagatsuma | .......... | G06F 3/0481 |
| 2017/0357442 A1* | 12/2017 | Peterson | ............... | G06F 3/0482 |

* cited by examiner

*Primary Examiner* — Jennifer N To
*Assistant Examiner* — Reji Kartholy
(74) *Attorney, Agent, or Firm* — Lee, Hong, Degerman, Kang & Waimey

(57) ABSTRACT

A mobile terminal and a method for controlling the same are disclosed, in which a screen split view of execution screens of a plurality of applications included in a recently used list is provided. In more detail, a mobile terminal and a method for controlling the same are disclosed, in which different screen split views are provided depending on whether a screen which is being output to a display unit is an input mode or non-input mode of an application.

18 Claims, 23 Drawing Sheets

< 1301 >  < 1302 >

< 1401 >  < 1402 >

<2301>     <2302>

<2401>     <2402>

MOBILE TERMINAL AND METHOD FOR CONTROLLING THE SAME

CROSS-REFERENCE TO RELATED APPLICATIONS

Pursuant to 35 U.S.C. § 119(a), this application claims the benefit of earlier filing date and right of priority to Korean Application No. 10-2016-0120697, filed on Sep. 21, 2016, the contents of which are hereby incorporated by reference herein in its entirety.

BACKGROUND OF THE INVENTION

Field of the Invention

The present invention relates to a mobile terminal that provides screen split views of execution screens of a plurality of applications included in a recently used list and a method for controlling the same. More particularly, the present invention relates to a mobile terminal that provides different screen split views depending on whether a screen of a display unit, which is being output, is an input mode or non-input mode of an application, and a method for controlling the same.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality, which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Simultaneous use of a plurality of applications through multi-tasking has increased in a smart machine such as a smart phone. However, if a plurality of applications are not output to one screen, inconvenience occurs in that a user should repeatedly convert the output screen. In addition, it is likely that an application in which an input mode is supported should be converted to another application to search for an input matter. For example, it is likely that a user additionally executes a memo application to search for an account number stored in the memo application while using a bank application.

SUMMARY OF THE INVENTION

Accordingly, the present invention is directed to a mobile terminal and a method for controlling the same that substantially obviates one or more problems due to limitations and disadvantages of the related art.

An object of the present invention is to provide a mobile terminal and a method for controlling the same, in which execution screens of a plurality of applications may be output at the same time.

Another object of the present invention is to provide a mobile terminal that may output an application to a part of a current screen of an application, which is being executed, without converting the current screen to another screen to search for an input matter in an input mode of the application, and a method for controlling the same.

Other object of the present invention is to provide a mobile terminal and a method for controlling the same, in which a screen split view may be set easily from a recently used list.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a mobile terminal according to one aspect of the present invention comprises a display unit; a sensing unit; and a controller, wherein the controller outputs a first recently used list, which includes at least some of recently used applications, to a location of an input means area of the display unit if a first input signal is sensed in an input mode of a first application, and outputs a screen split view, which includes an execution screen of the first application and an execution screen of a second application included in the first recently used list, if a second input signal for the second application is sensed.

In another aspect of the present invention, a method for controlling a mobile terminal comprises the steps of sensing a first input signal in an input mode of a first application; outputting a first recently used list, which includes at least some of recently used applications, to a location of an input means area of a display unit; sensing a second input signal for a second application included in the first recently used list; and outputting a screen split view, which includes an execution screen of the first application and an execution screen of the second application.

In another aspect of the present invention comprises a display; a sensing unit; and a controller configured to: cause the display to display an input area during an input mode of a first application being executed; cause the display to display a first list, which includes at least one recently used application, at a location corresponding to the input area during response to a first input received in the input mode; and cause the display to display execution screens of two applications in a screen split view in response to a second input for selecting a second application from the first list such that an execution screen of the first application is displayed at a first portion of the display and an execution screen of the second application is displayed at a second portion of the display.

In another aspect of the present invention, a method for controlling a mobile terminal comprises the steps of displaying an input area during an input mode of a first application being executed; sensing a first input received in the input mode; displaying a first list, which includes at least one recently used application, at a location corresponding to the input area during response to the first input; sensing a second input received for selecting a second application from the first list; and displaying executed screens of two applications in a screen split view in response to the second input such that an execution screen of the first application is displayed at a first portion of the display and an execution screen of a second application is displayed at a second portion of the display.

It is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
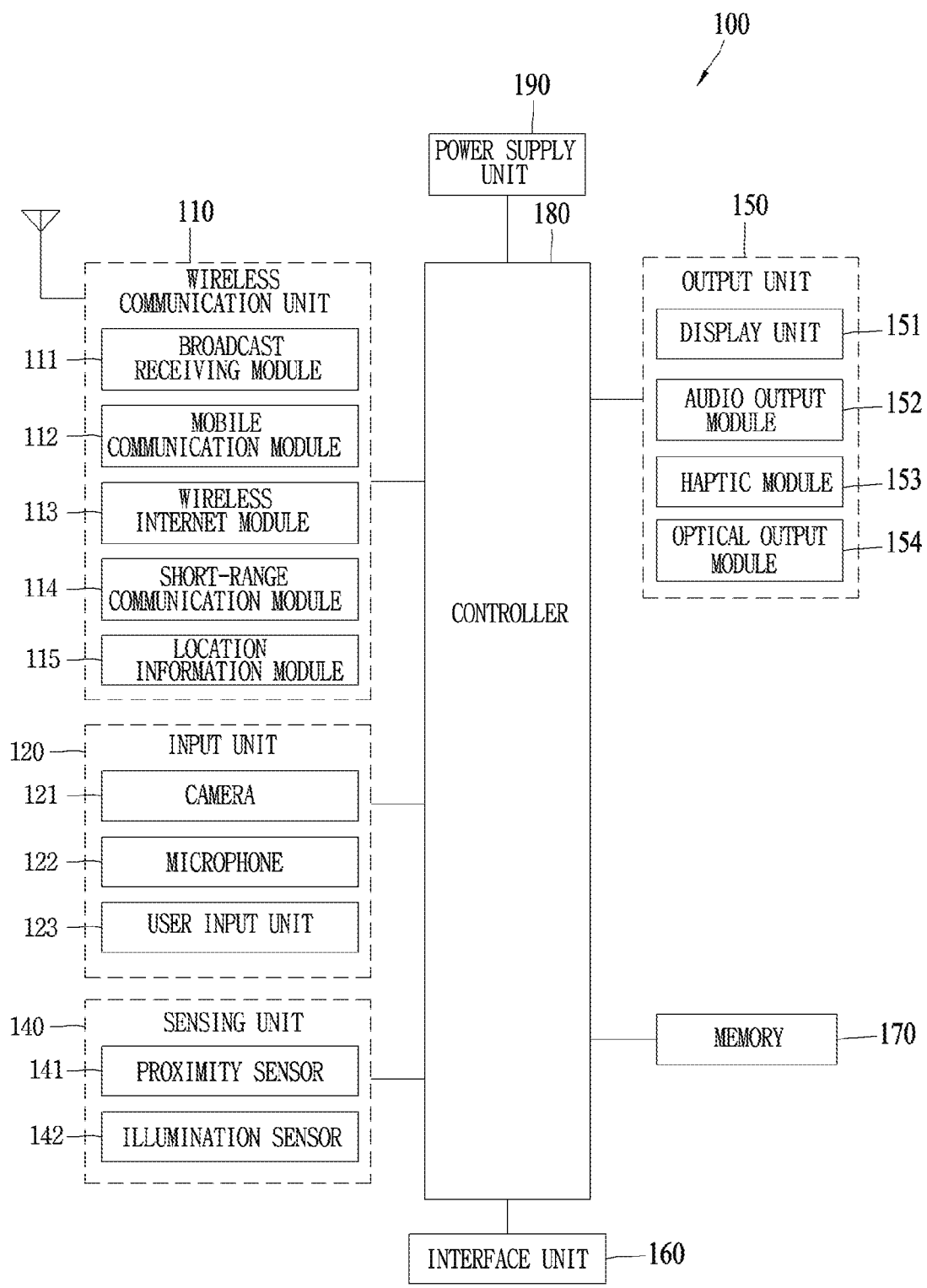
FIG. 1A is a block diagram of a mobile terminal in accordance with the present disclosure.
Figure 1B:
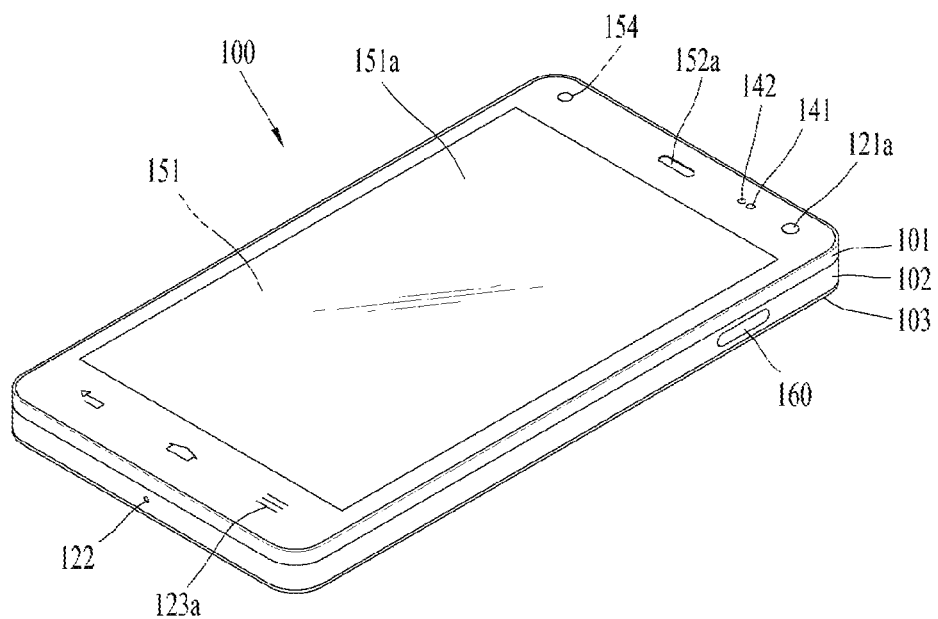
FIGS. 1B and 1C are conceptual views of one example of the mobile terminal, viewed from different directions.
Figure 1C:
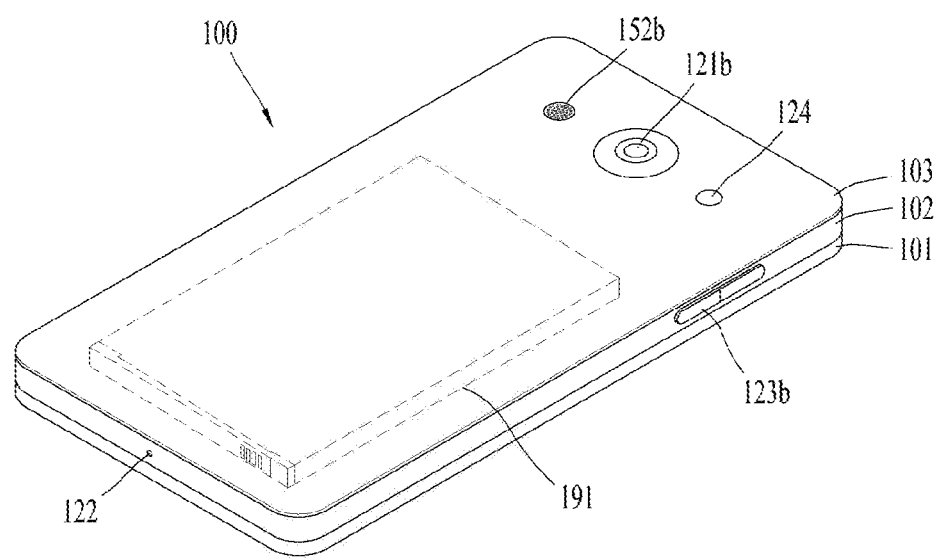

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may process signals, data and information, which are input or output through the aforementioned components, or may process information or functions appropriate for a user by driving an application program stored in the memory 170.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the aforementioned components may be operated in cooperation with each other to implement the operation, control or control method of the mobile terminal according to various embodiments which will be described hereinafter. Also, the operation, control or control method of the mobile terminal may be implemented on the mobile terminal by driving of at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.).

The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supplies the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like).

However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output modules 152a and 152b, a proximity sensor 141, an illumination sensor 142, an optical output module 154, first and second cameras 121a and 121b, first and second manipulation units 123a and 123b, a microphone 122, and an interface unit 160.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, in the present invention, the information processed by the mobile terminal may be displayed using a flexible display. Hereinafter, this will be described in more detail based on the accompanying drawing.

Figure 2:
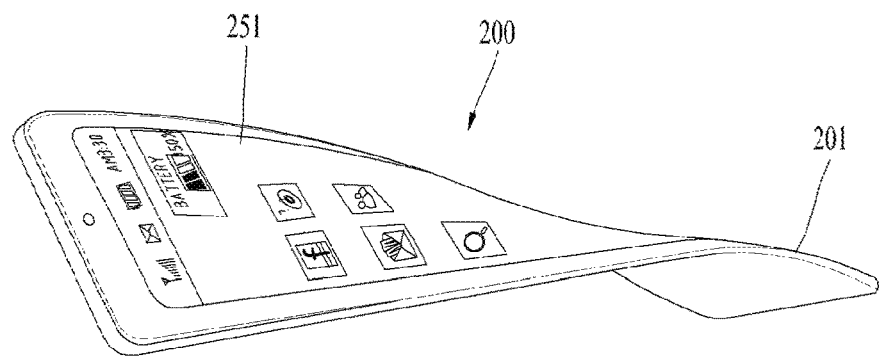
FIG. 2 is a conceptual view of a deformable mobile terminal according to an alternative embodiment of the present disclosure.

FIG. 2 is a conceptual view of a deformable mobile terminal according to an alternative embodiment of the present invention.

In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
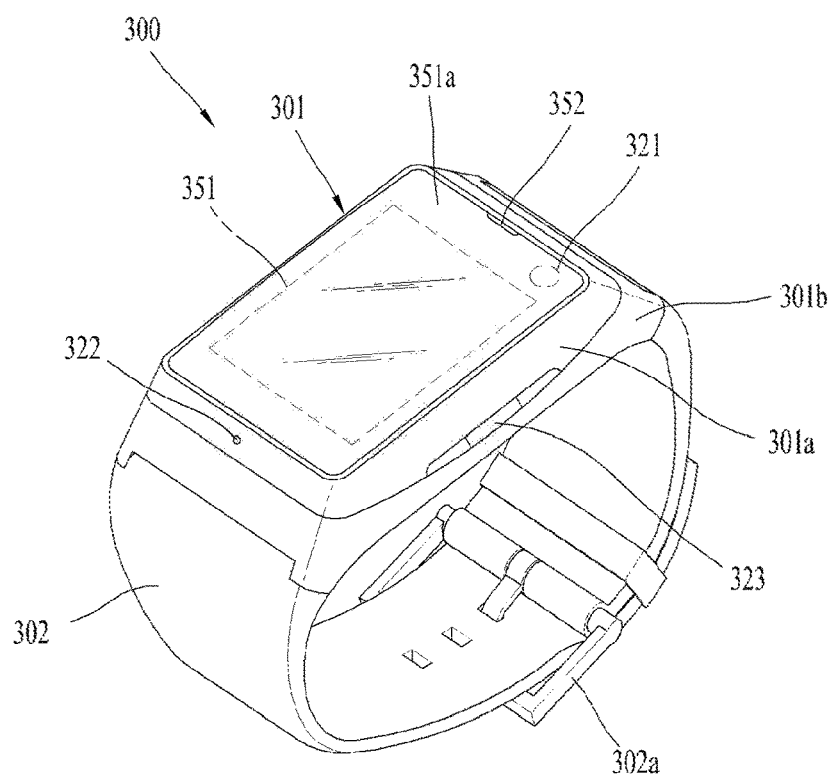
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment.

As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351*a* is positioned on the first case 301*a* to form a front surface of the terminal body together with the first case 301*a*.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302*a*. The fastener 302*a* may be implemented into a buckle type, a snap-fit hook structure, a Velcro® type, or the like, and include a flexible section or material. The drawing illustrates an example that the fastener 302*a* is implemented using a buckle.

Figure 4:
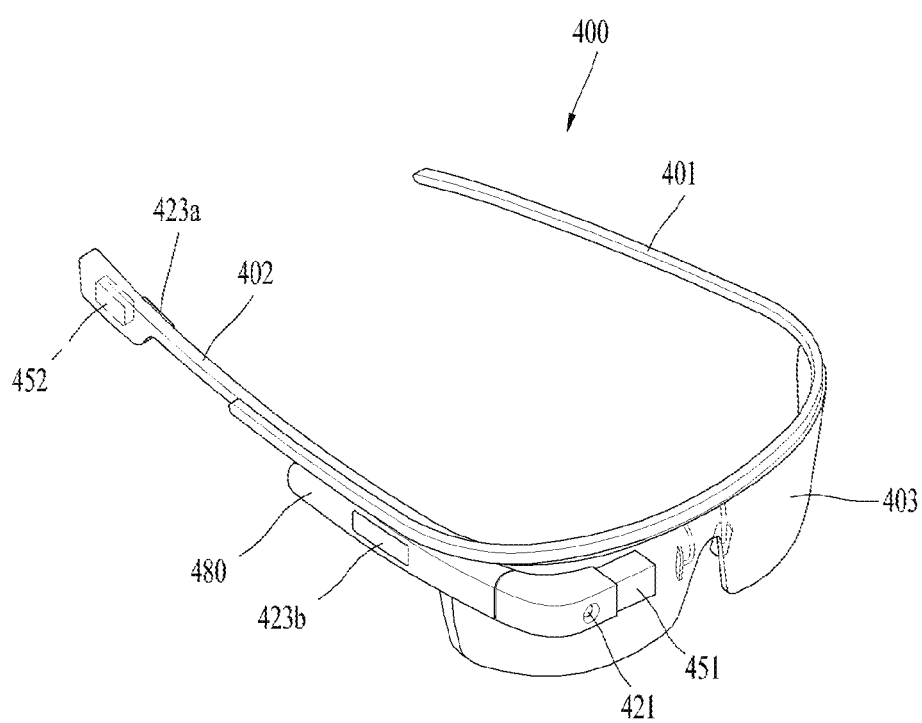
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment.

The glass-type mobile terminal 400 can be wearable on a head of a human body and provided with a frame (case, housing, etc.) therefore. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing.

The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423*a* and 423*b*, which can each be manipulated by the user to provide an input. The user input units 423*a* and 423*b* may employ techniques which permit input via a tactile input. Typical tactile inputs include a touch, push, or the like. The user input units 423*a* and 423*b* are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail.

Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal.

Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e.g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

Figure 5:
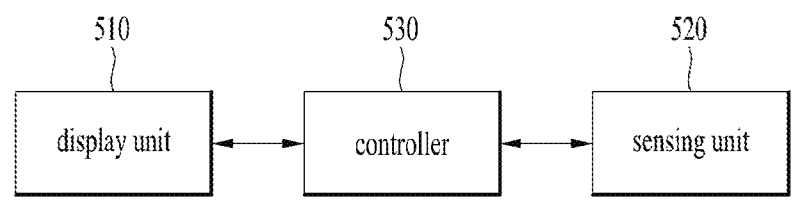
FIG. 5 is a view illustrating a block diagram of a mobile terminal according to one embodiment of the present invention.

FIG. 5 is a view illustrating a block diagram of a mobile terminal according to one embodiment of the present invention.

According to the present invention, the mobile terminal may include a display unit 510, a sensing unit 520, and a controller 530. Also, the component modules provided in the mobile terminal are not limited to these units and the controller, and the mobile terminal may further include various component modules.

The display unit 510 may display visual information. In this case, the visual information may include contents, application, image, moving picture, icon, etc. Also, the display unit 510 may display information processed by the mobile terminal 100. For example, the display unit 510 may basically output various images and text information, and may display a user interface (UI) and a graphic user interface (GUI) according to execution screen information of the application program driven in the mobile terminal 100. Also, the display unit 510 may output the visual information on the screen based on a control command of the controller 530.

The display unit 510 may include at least one of a liquid crystal display (LCD), a thin film transistor-liquid crystal display (TFT LCD), an organic light-emitting diode (OLED), a flexible display, a 3D display, and an e-ink display.

In the present invention, the display unit 510 may be embodied as the display 151 of FIG. 1*a*. Also, in the present invention, the display unit 510 may be provided as a type of touch screen together with the sensing unit 520. According to one embodiment of the present invention, the display unit 510 may output an execution screen of an application, a recently used list, etc. In addition, according to one embodiment of the present invention, the display unit 510 may output an input means area such as a keyboard if an application, which is being executed, is an input mode.

The sensing unit 520 may sense various inputs of a user for the mobile terminal 100 and an environment of the mobile terminal 100 and forward the sensed result to the controller 530 to allow the controller 530 to perform the operation according to the sensed result. In the present invention, the sensing unit 520 may be embodied as the sensing unit 140 or the input unit, which is shown in FIG. 1*a*. According to one embodiment of the present invention, the sensing unit 520 may sense various touch inputs. For example, the sensing unit 520 may sense various touch inputs such as a short touch, a long touch, a long and drag touch and a pinch-out touch.

The controller 530 may process data, control the aforementioned units of the mobile terminal 100, and control data transmission and reception between the units. In the present invention, the controller 530 may be embodied as the controller 180 of FIG. 1*a*. According to one embodiment of the present invention, the controller 530 may control the display unit 510 to output an execution screen of an application on the display unit 510.

As one embodiment of the present invention, the operations performed by the mobile terminal may be controlled by the controller 530. However, for convenience of description, these operations will be described by being performed by the mobile terminal in the drawings and the following description. Hereinafter, various methods for performing screen split in accordance with a type of an execution screen, which is being output from the mobile terminal to the display unit, will be described with reference to the embodiments of FIGS. 6 to 25.

Generally, if a recently used list is output on the mobile terminal, the recently used list may be output on the entire area of the display unit regardless of the type of application, which is being currently executed. In this case, if the recently used list is output in the same manner regardless of the application that is being used, intention of a user may not be reflected. Therefore, it is required to provide the recently used list differently depending on the type of the application which is currently executed by the user and a use mode of the application which is being executed.

Meanwhile, in the mobile terminal according to one embodiment of the present invention, it is assumed that a basic tool button is always located at the lowest area of the display unit. Also, in the present invention, the basic tool button is a button located on the display unit, and may correspond to a button enabled only if a power is supplied to the display unit. In this case, the basic tool button may include a home button, a back button, and a menu button. For example, the menu button may correspond to a recent list button. However, without limitation to the above examples, the basic tool button of the mobile terminal may be provided as a physical button separately at one side of the mobile terminal without being provided within the display unit.

Also, although the present invention illustrates and describes that an input signal for outputting the recently used list is sensed by the menu button, the present invention may include a double-push input sensed by the home button without limitation to the menu button.

Output of Recently Used List in Input Mode of Application

If an application is executed, an input mode may be enabled in accordance with a selection of a user or setup of the application. For example, if a message application is executed in the embodiments of FIGS. 6 to 14, the mobile terminal may output a message list per sender or a message transmission and reception screen between a sender and a user of the mobile terminal on the display unit. In the embodiments of FIGS. 6 to 14, in a state that the message transmission and reception screen is output, the mobile terminal enters the input mode.

Figure 6:
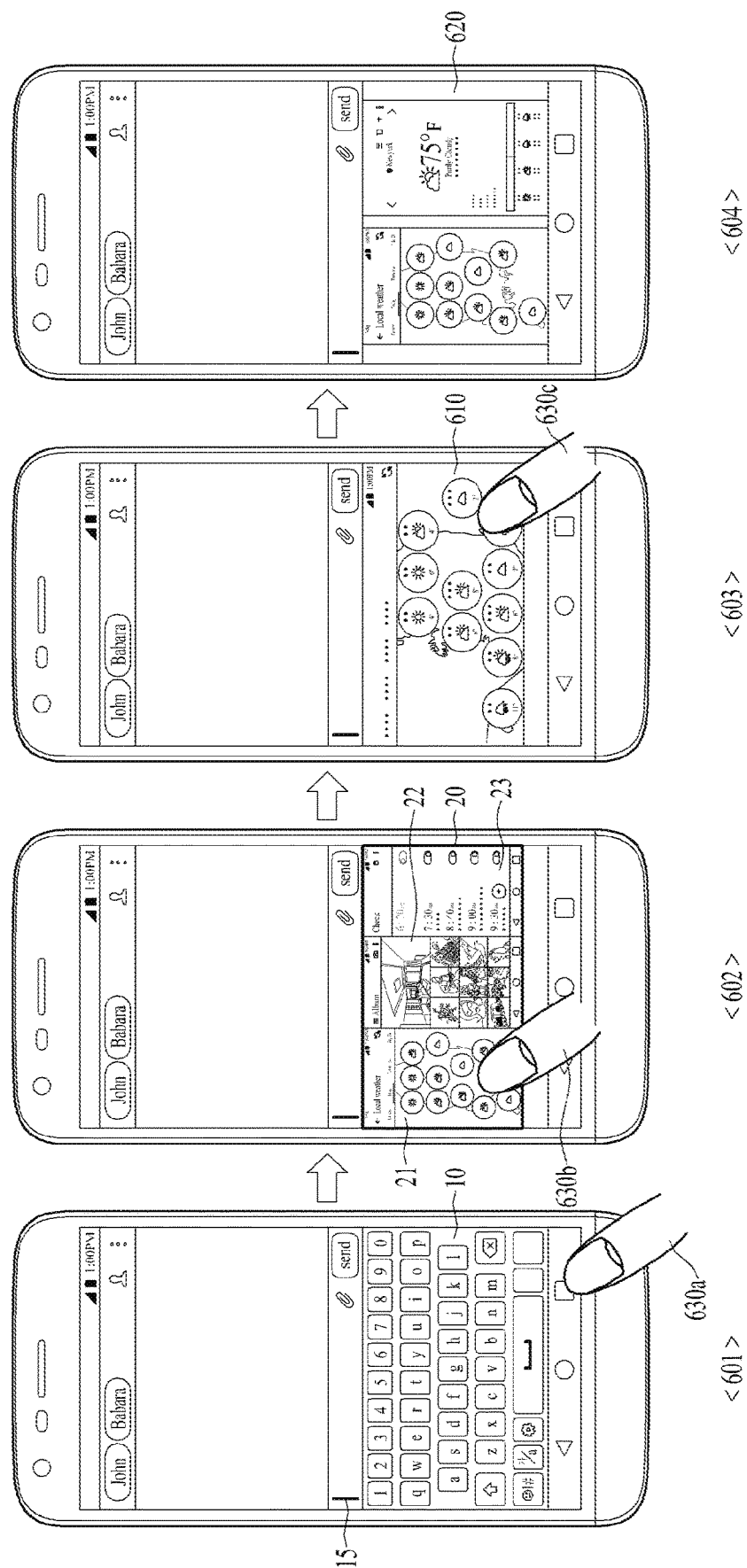
FIG. 6 is a view illustrating an example that screen split is performed in an input mode of an application which is being executed in a mobile terminal according to one embodiment of the present invention.

FIG. 6 is a view illustrating an example that screen split is performed in an input mode of an application which is being executed in a mobile terminal according to one embodiment of the present invention.

If the mobile terminal enters the input mode, the mobile terminal may output an input means area 10 on the display unit. In this case, the input means area 10 may correspond to an area that includes various input tools used for message input. For example, the input means area 10 includes, but not limited to, a keyboard area, an emoticon area, a voice recognition area, and a drawing area. Also, the mobile terminal may output an input result area 15 to one side of the input means area 10. In this case, the input result area 15 corresponds to an area where the input result generated based on the user input sensed by the input means area 10 is output. For example, the input result area 15 may output a cursor indicating a current input location.

First of all, referring to <601>, the mobile terminal may sense a first input signal 630*a* for the menu button in the input mode. In this case, the first input signal 630*a* may correspond to, but not limited to, a short touch input. Also, although the present invention describes and illustrates that the first input signal 630*a* is sensed by the menu button, the first input signal 630*a* may include an input signal sensed by the home button depending on the type of the mobile terminal.

In this case, as shown in <602>, the mobile terminal may output the recently used list 20 to the location, to which the input means area 10 of the display unit is output, to correspond to the first input signal 630*a*. In this case, the mobile terminal may stop the output of the input means area 10 and output the recently used list 20.

The recently used list 20 may indicate a list of another application executed by the user before the application which is currently executed is used. Also, the recently used list 20 may indicate a list of a predetermined number of applications among recently used applications. For example, the recently used list 20 may indicate a list of three applications of a plurality of applications in FIG. 6. Also, a screen of an application output from the recently used list 20 may correspond to a screen where the corresponding application is finally executed by the user, or may correspond to a default screen. For example, in the embodiment of FIG. 6, the recently used list 20 may correspond to a weather application 21, a gallery application 22, and an alarm application 23. Meanwhile, the list of applications output from the recently used list 20 may be implemented variously depending on user setup or setup of the mobile terminal. This will be described with reference to FIG. 7.

Referring to <602>, the mobile terminal may sense a second input signal 630*b* that selects the weather application 21 of the recently used list 20. For example, the second input signal 630*b* corresponds to, but not limited to, a short touch input. In this case, as shown in <603>, the mobile terminal may output a first execution screen 610 of the weather application to the location where the recently used list 20 is output. At this time, the mobile terminal may execute the weather application and output the first execution screen 610 of the weather application. The weather application screen 21 output in <602> indicates only an application list not the execution screen of the weather application, and the weather application screen 610 output in <603> may correspond to the execution screen of the actual application.

At this time, the mobile terminal may sense a third input signal 630c that selects one area of the weather application execution screen 610. For example, the third input signal 630c corresponds to, but not limited to, a short touch input. In this case, as shown in <604>, the mobile terminal may output a second execution screen 620 on the display unit, wherein the second execution screen 620 outputs a basic execution screen of the weather application and a weather screen of the selected area to the location to which the first execution screen 610 of the weather application is output, through split of ½. That is, the mobile terminal may output the basic screen and additional detailed screen at the same time. Meanwhile, although the basic execution screen and the additional detailed screen are output through split of ½ in the embodiment of FIG. 6, it will be apparent that the corresponding screens may be output at various rates such as ⅓ and ⅔.

Figure 7:
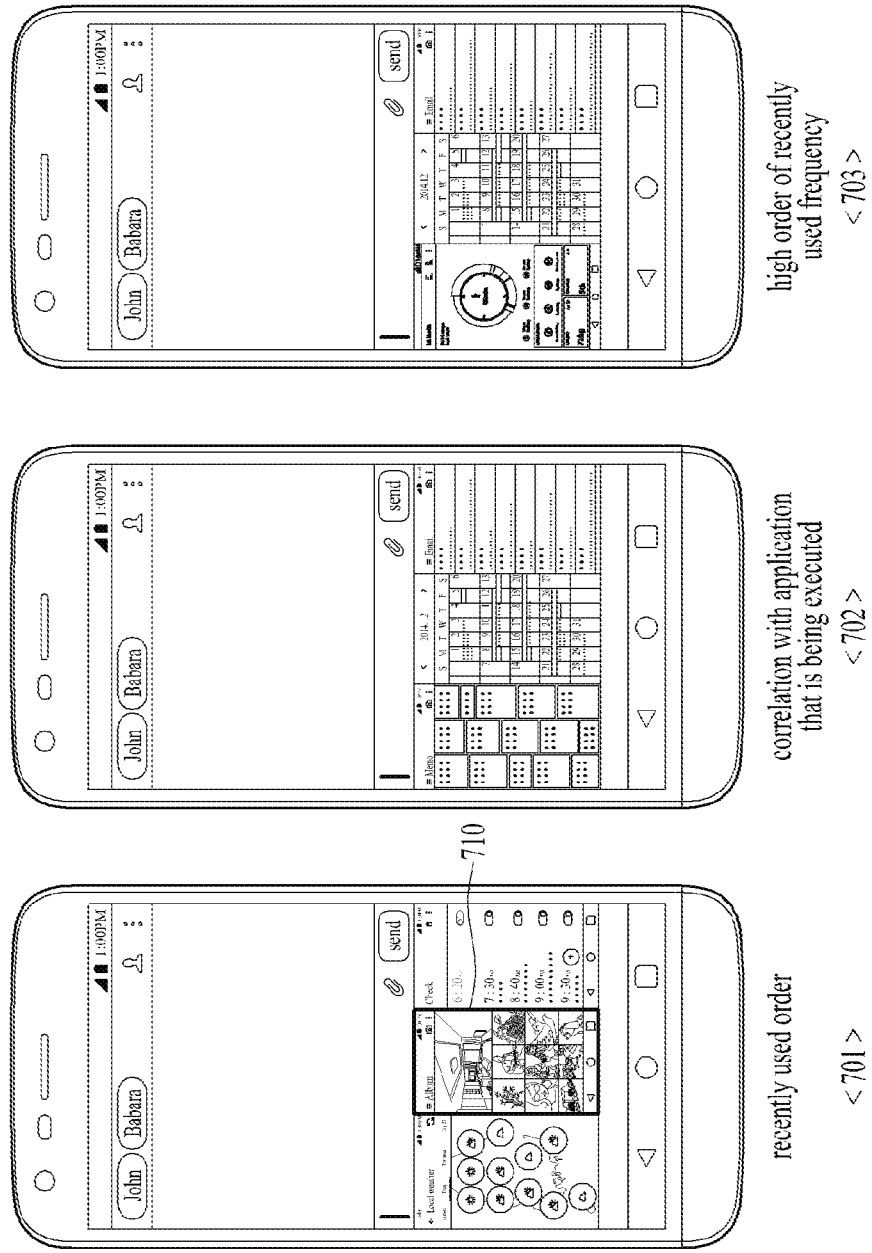
FIG. 7 is a view illustrating an example that a recently used list is output in an input mode of an application which is being executed in a mobile terminal according to one embodiment of the present invention.

FIG. 7 is a view illustrating an example that a recently used list is output in an input mode of an application which is being executed in a mobile terminal according to one embodiment of the present invention.

As described with reference to FIG. 6, the mobile terminal may stop the output of the input means area and output the recently used list if the input signal for the menu button is sensed in a state that the input means area is output. At this time, the recently used list may be determined in various manners by user setup or basic setup of the mobile terminal.

As one example, the recently used list may be determined based on a recently used order before the message application is used. That is, in <701>, a list located at a left side of the recently used list may correspond to an application used just before the message application is used, a list located at a center of the recently used list may correspond to an application used before the second to use of the message application, and a list located at a right side of the recently used list may correspond to an application used before the third to use of the message application. Meanwhile, the recently used list may be aligned from right to left in accordance with the order of applications that are used.

At this time, the mobile terminal may provide a highlight indicator 710 if an application frequently used by the user exists in the recently used list. For example, if meta data based on information of a gallery exist when the user sends a message, the mobile terminal may output the highlight indicator 710 to the gallery application of the recently used list.

As another example, the recently used list may be determined based on correlation with the message application. That is, in <702>, the mobile terminal may output a list of applications related to the message application, such as a memo application, a calendar application and an email application, on the recently used list.

Also, as still another example, the recently used list may be determined based on the high order of frequency recently used by the user. That is, in <703>, a list located at a left side may correspond to an application of which use frequency is the highest, a list located at a center may correspond to an application of which use frequency is the second, and a list located at a right side may correspond to an application of which use frequency is the third. Also, the recently used list may be aligned from right to left in accordance with use frequency of the applications.

Figure 8:
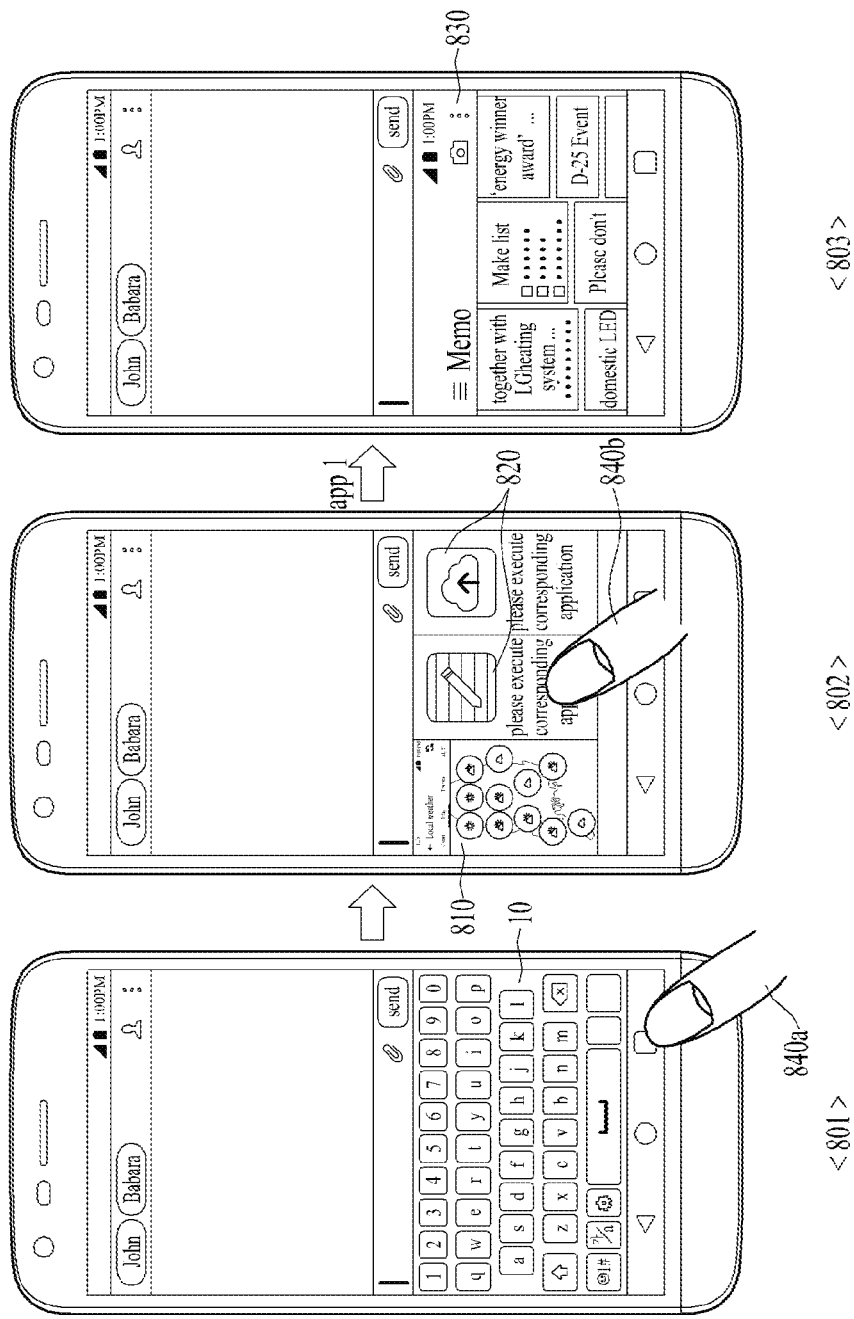
FIG. 8 is a view illustrating another example that screen split is performed in an input mode of an application which is being executed in a mobile terminal according to one embodiment of the present invention.

FIG. 8 is a view illustrating another example that screen split is performed in an input mode of an application which is being executed in a mobile terminal according to one embodiment of the present invention.

In more detail, FIG. 8 illustrates a screen output when there is no recently used application if an input signal for outputting the recently used list onto the input means area is sensed. In the embodiment of FIG. 8, repeated description for the aforementioned description of FIG. 6 will be omitted.

Referring to <801>, the mobile terminal may output the recently used list 20 to the area where the input means 10 is located, if a first input signal 840a for the menu button is sensed in an input mode. At this time, unlike FIG. 6, the application used before the message application is used in the mobile terminal may correspond to a weather application 810 only. In this case, the mobile terminal may output a recommended application list 820 mainly used when the user uses the message application, to an area 820 other than the screen for outputting the weather application 810, on a screen for the recently used list. In this case, the application output from the recommended application list 820 may be determined user data. That is, the mobile terminal may provide the user with a guide that may recommend a related application even there is no recently used list of the user.

As shown in <802>, if a second input signal 840b for the recommended application list 820 is sensed, the mobile terminal may output an execution screen 830 of the selected recommended application to the location to which the recently used list 20 is output. As shown in <803>, the mobile terminal may output an execution screen 830 of the memo application selected from the recommended application list 820.

Figure 9:
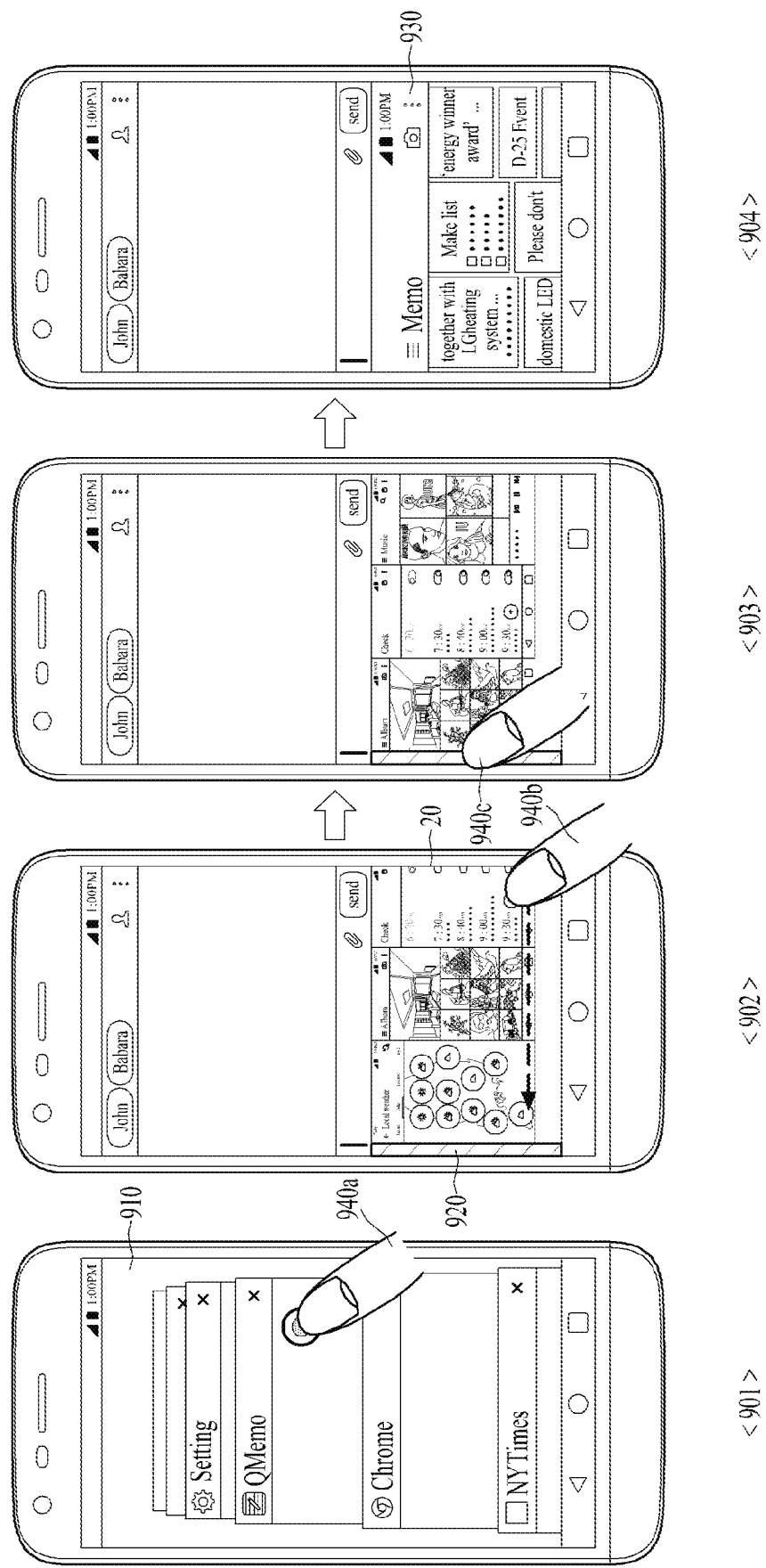
FIG. 9 is a view illustrating still another example that screen split is performed in an input mode of an application which is being executed in a mobile terminal according to one embodiment of the present invention.

FIG. 9 is a view illustrating still another example that screen split is performed in an input mode of an application which is being executed in a mobile terminal according to one embodiment of the present invention;

In more detail, FIG. 9 illustrates a screen for outputting a predetermined holding application if the recently used list is output on the input means area. In the embodiment of FIG. 9, repeated description for the aforementioned description of FIG. 6 will be omitted.

Referring to <901>, the mobile terminal may output the recently used list 910 on the display unit in a state that the message application is not executed. At this time, the recently used list 910 may be output to the full screen of the display unit. Also, the number of applications included in the recently used list 910 is more than the number of applications included in the recently used list 20 output to the input means area 10 shown in FIGS. 6 to 8. Also, the mobile terminal may sense a first input signal 940a for selecting one application included in the recently used list 910. In this case, the first input signal 940a may correspond to a long touch input or long-press touch input.

In this case, the mobile terminal may set the selected application as a holding application in response to the first input signal 940a. The holding application corresponds to an application set to be always executed when the recently used list is output. Meanwhile, although not shown in FIG. 9, if the first input signal 940a corresponds to the short touch input, the mobile terminal may output an execution screen of the selected application in response to the first input signal 940a.

Afterwards, the mobile terminal may execute the message application and enter the input mode. Also, although not shown in FIG. 9, the mobile terminal may output the recently used list 20 to the input means area if the input signal for the menu button is sensed. For example, the application output to the recently used list 20 may correspond to the application list determined as shown in FIG. 7.

At this time, as shown in <902>, the mobile terminal may output a holding application indicator 920 to one side of the recently used list 20. As a result, the user may easily recognize the presence of the holding application set by himself/herself. Next, referring to <902>, the mobile terminal may correspond to a second input signal 940b for the recently used list 20. For example, the second input signal 940b may correspond to a drag touch input or flicking touch input in one direction. In the embodiment of FIG. 9, although the second input signal 940b is a signal sensed after the first input signal 940a for determining the holding application, it is assumed that there is no separate correlation between the first and second input signals.

In this case, referring to <903>, the mobile terminal may change a type of an application output onto the recently used list 20 in response to the second input signal 940b. That is, the mobile terminal may scroll the application output onto the recently used list 20, in response to the drag touch or flicking touch input. As a result, the user may search for a desired application. However, if there are many applications included in the recently used list 20, it may be difficult to quickly search for a desired application through scrolling. Therefore, in this case, it is easy to access the desired application through the holding application indicator 920.

That is, as shown in <903>, the mobile terminal may sense a third input signal 940c for the holding application indicator 920. For example, the third input signal 940c corresponds to, but not limited to, a short touch input. In this case, as shown in <904>, the mobile terminal may output an execution screen 940 of the memo application set as the holding application to the input means area 10. In this embodiment, it is not required that the second input signal 940b should be sensed before the third input signal 940c is sensed, and the third input signal 940c may be sensed without the second input signal 940b.

Figure 10:
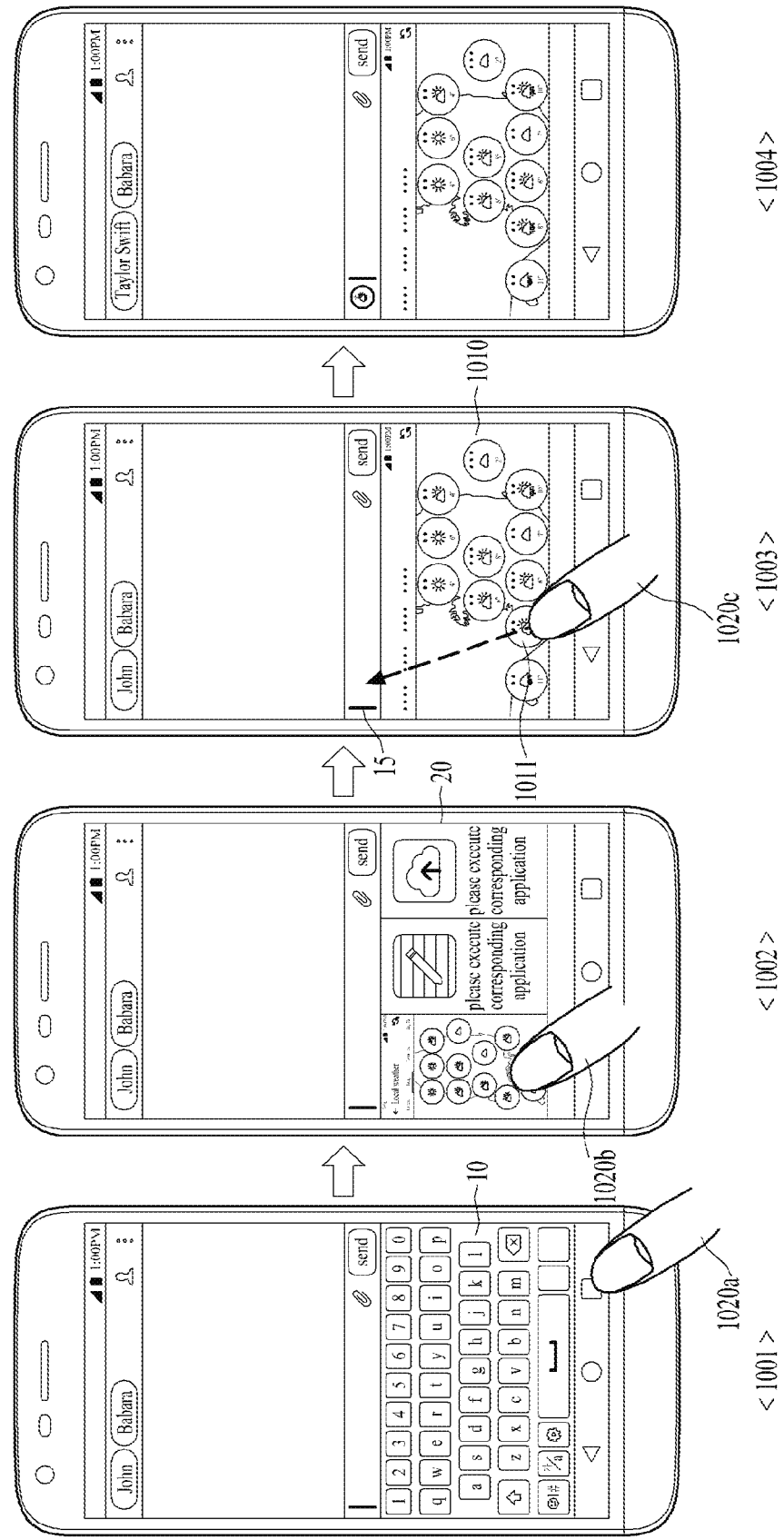
FIG. 10 is a view illustrating further still another example that screen split is performed in an input mode of an application which is being executed in a mobile terminal according to one embodiment of the present invention.

FIG. 10 is a view illustrating further still another example that screen split is performed in an input mode of an application which is being executed in a mobile terminal according to one embodiment of the present invention.

In more detail, FIG. 10 illustrates a screen where a part of contents included in an application is output to the input result area 15 in a state that the recently used list is output to the input means area. In the embodiment of FIG. 10, repeated description for the aforementioned description of FIG. 6 will be omitted.

Referring to <1001>, the mobile terminal may output the recently used list 20 to the input means area 10 if a first input signal 1020a for the menu button is sensed in the input mode. Also, referring to <1002>, the mobile terminal may sense a second input signal 1020b for selecting an application included in the recently used list 20.

Also, the mobile terminal may output an execution screen 1010 of the selected application to the input means area 10 in response to the second input signal 1020a. For example, as shown in <1003>, the mobile terminal may output the execution screen 1010 of the weather application to the input means area 10. In this case, the execution screen 1010 of the weather application may include a plurality of icons indicating weather per city.

The user may desire to input contents not text to an input editing area 15 in the input mode of the message application. The user may search for a desired content on the execution screen of the application output to the input means area and share the searched content through a touch input to the input editing area.

That is, as shown in <1003>, the mobile terminal may sense a third input signal 1020c for dragging an icon included in the execution screen 1010 of the application. In this case, the third input signal 1020c corresponds to a drag touch input that starts at a location of an icon 1011 and ends at the input editing area 15. In this case, referring to <1004>, the mobile terminal may output the icon 1011 selected by the third input signal 1020c from the input editing area 15.

Also, although not shown in FIG. 10, if an input button for a send button is sensed, the mobile terminal may transmit the icon 1011 to a terminal of the other party. Also, although an image icon has been described as an example in the embodiment of FIG. 10, if a music icon is selected, the mobile terminal may transmit a music file to a terminal of the other party. Also, if a document icon and a contact address icon are selected, a document file and a contact address file may be transmitted to a terminal of the other party.

Figure 11:
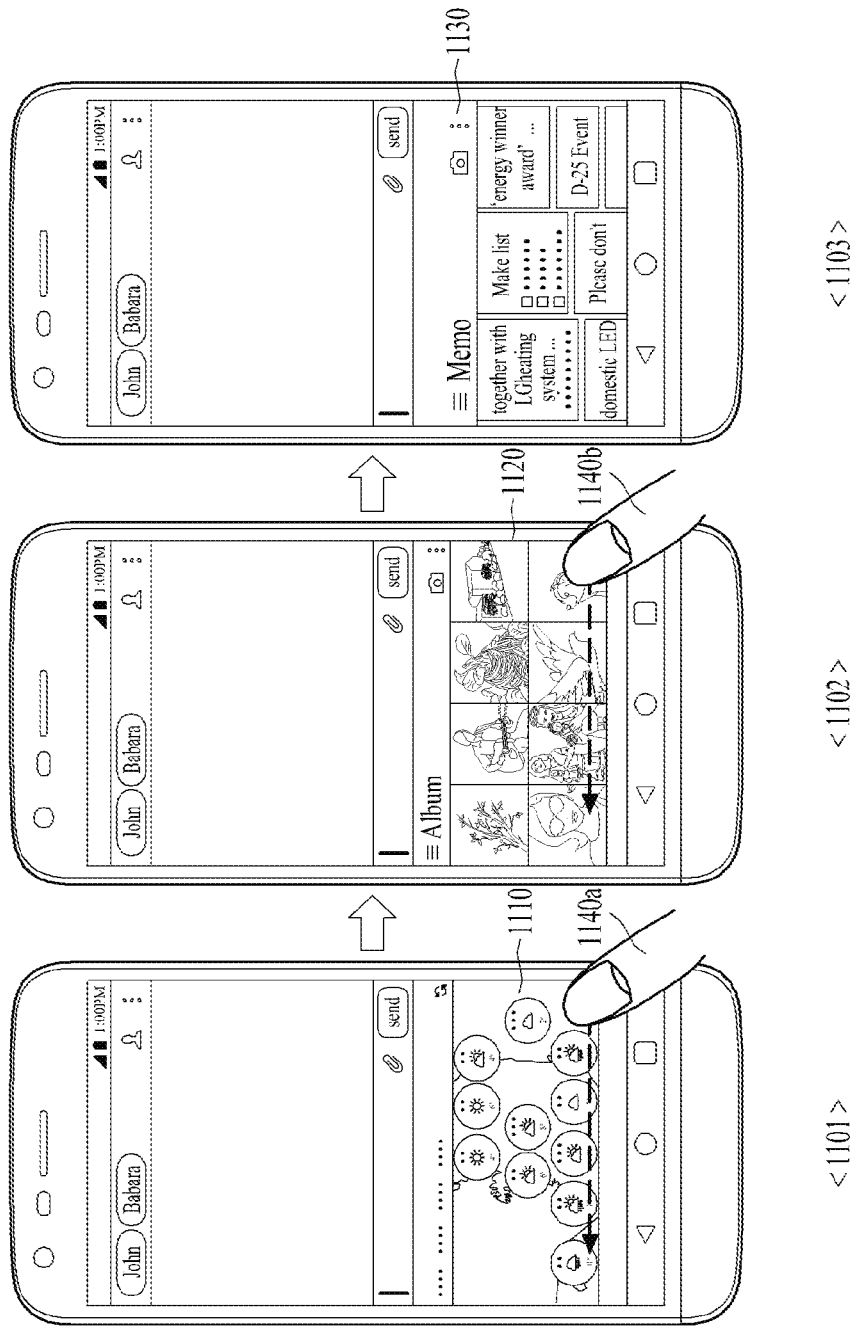
FIG. 11 is a view illustrating an example of a type of a recently used list that is output to a location of an input means area in a mobile terminal according to one embodiment of the present invention.

FIG. 11 is a view illustrating an example of a type of a recently used list that is output to a location of an input means area in a mobile terminal according to one embodiment of the present invention.

If the recently used list is output in a state that the message application is executed, a plurality of application lists are output together with the recently used list, as described with reference to FIGS. 6 to 10. In FIG. 11 unlike FIGS. 6 to 10, if the recently used list is output in a state that the message application is executed, it is assumed that a screen of one application is output. At this time, the screen of one application corresponds to a screen for indicating an application list not the executing state of the application. However, it will be apparent that the screen which is output may be the execution screen of the application.

Referring to <1101>, the mobile terminal may sense a first input signal 1140a in a state that a first application screen 1110 is output to the input means area. In this case, the first input signal 1140a may correspond to a drag touch input or flicking touch input in one direction. In the embodiment of FIG. 11, it is assumed that the first input signal 1140a is a flicking touch input of a left direction. In this case, as shown in <1102>, the mobile terminal may remove the first application screen 1110 from the input means area and output a second application screen 1120 to the input means area.

Also, in a state that the second application screen 1120 is output, the mobile terminal may sense a second input signal 1140b. In this case, the second input signal 1140b may correspond to a drag touch input or flicking touch input in one direction. In this case, as shown in <1103>, the mobile terminal may remove the second application screen 1120 from the input means area and output a third application screen 1130 to the input means area.

In the embodiment of FIG. 11, the application screen that is output may correspond to an application used before the message application is executed. Also, although not shown in FIG. 11, if a short touch input not a drag touch input or flicking touch input is sensed in a state that the first to third application screens are output, the mobile terminal may output an execution screen by actually executing the corresponding application.

Figure 12:
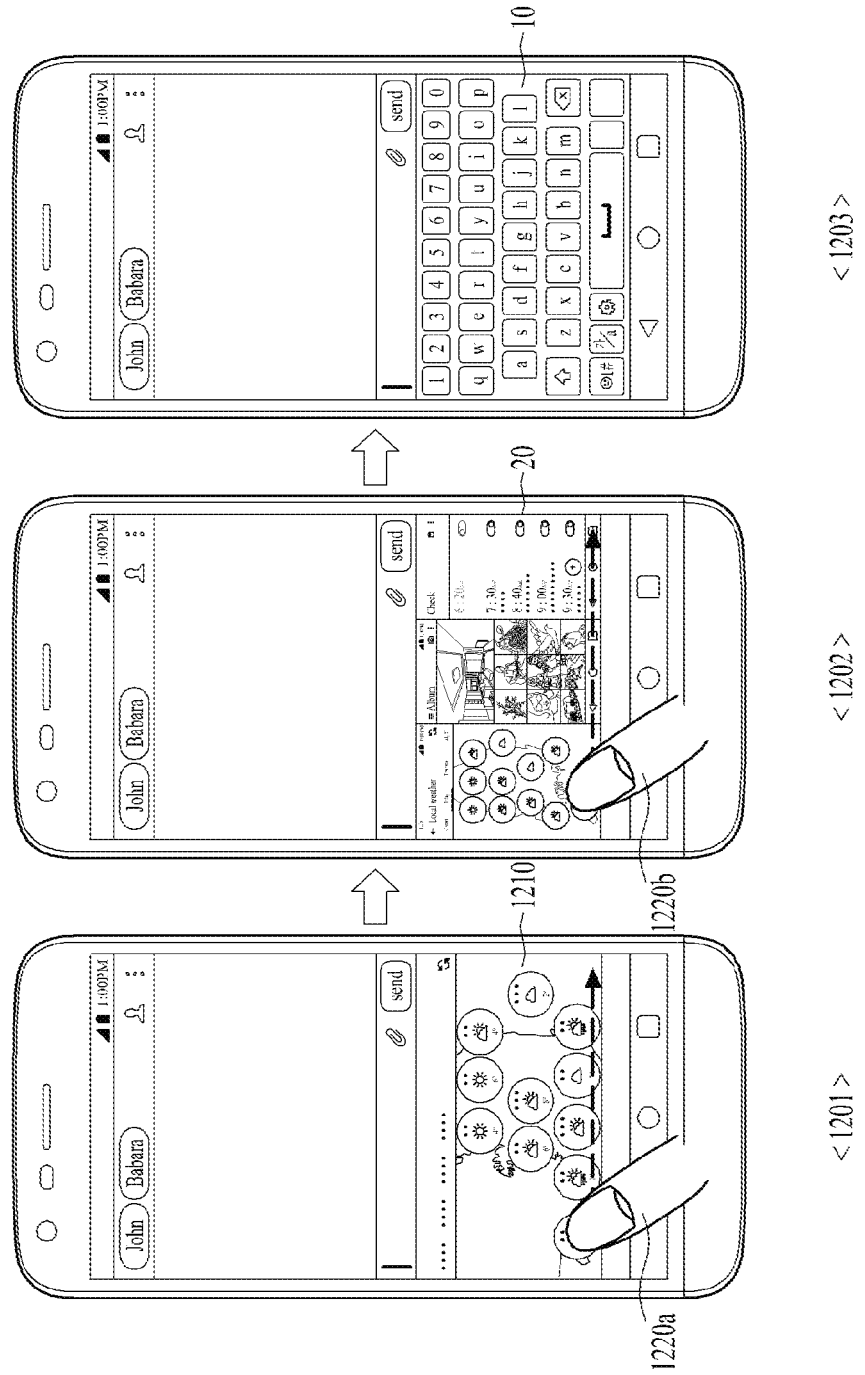
FIG. 12 is a view illustrating further still another example that screen split is performed in an input mode of an application which is being executed in a mobile terminal according to one embodiment of the present invention.

FIG. 12 is a view illustrating further still another example that screen split is performed in an input mode of an application which is being executed in a mobile terminal according to one embodiment of the present invention.

In more detail, FIG. 12 illustrates a method for outputting an input means again in a state that a recently used list is output to a location to which an input means area is output. Also, in the embodiment of FIG. 12, repeated description for the aforementioned description of FIG. 6 will be omitted.

Referring to <1201>, the mobile terminal may output an application screen 1210 to the input means area. At this time, the mobile terminal may sense a first input signal 1220a for the application screen 1210. In this case, the first input signal 1220a may correspond to a drag touch input or flicking touch input in one direction. In the embodiment of FIG. 12, the direction of the first input signal 1220a may be opposite to a direction of the input signal of FIG. 11. In the embodiment of FIG. 12, it is assumed that the first input signal 1220a is a flicking touch input of a right direction.

In this case, as shown in <1202>, the mobile terminal may remove the application screen 1210 from the input means area and output the recently used list 20 to the input means area. That is, the mobile terminal may output a screen of a higher category in accordance with the drag (flicking) touch input in a right direction.

Also, in a state that the recently used list 20 is output, the mobile terminal may sense a second input signal 1220b. In this case, it is assumed that the second input signal 1220b is the same input signal as the first input signal 1220a. In this case, as shown in <1103>, the mobile terminal may remove the recently used list 20 from the input means area and output a keyboard 10 that is the input means.

That is, through the embodiment of FIG. 12, if the input means is located at a lower depth in the input means area of the message application, the input means may move to a higher depth through a drag (flicking) touch input.

Figure 13:
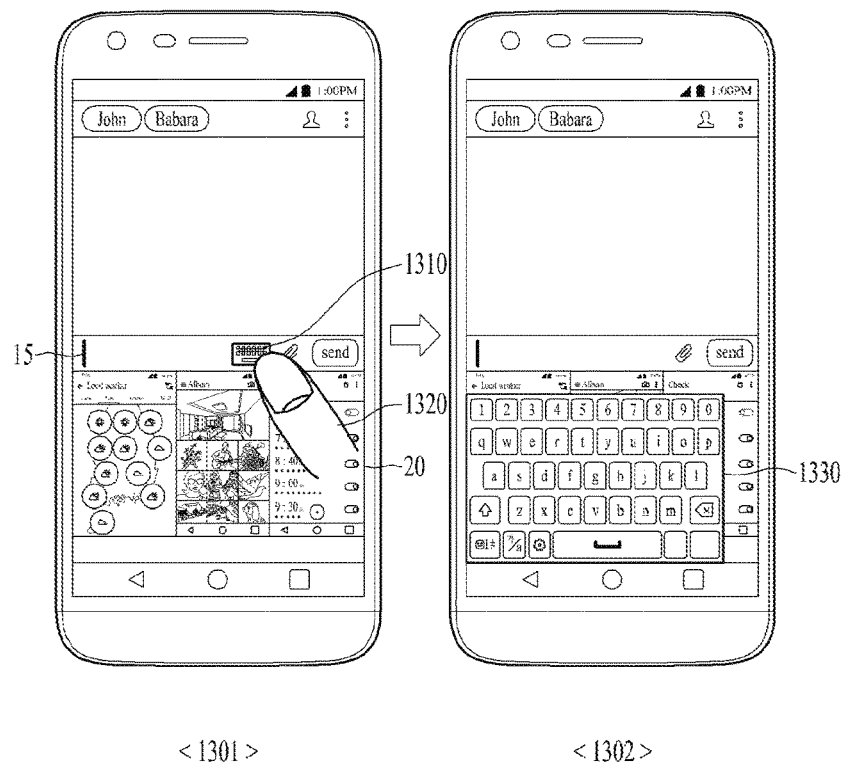
FIG. 13 is a view illustrating an example of a content output from an input means area in an input mode of an application which is being executed in a mobile terminal according to one embodiment of the present invention.

FIG. 13 is a view illustrating an example of a content output from an input means area in an input mode of an application which is being executed in a mobile terminal according to one embodiment of the present invention.

In more detail, the embodiment of FIG. 13 illustrates a method for outputting an input means such as a keyboard in a manner unlike FIG. 12 if a recently used list is output to the input means area. Also, in the embodiment of FIG. 13, repeated description for the aforementioned description of FIG. 6 will be omitted.

If the recently used list 20 is output to the input means area, the mobile terminal may output a keyboard icon 1310 on the input editing area 15. This is to allow the user to easily convert the state that the recently used list 20 is output, to the keyboard.

Referring to <1301>, the mobile terminal may sense an input signal 1310 for the keyboard icon 1310. In this case, as shown in <1302>, the mobile terminal may output a keyboard 1330 onto the recently used list 20. For example, the keyboard 1330 may be output by being overlaid on the recently used list 20.

Figure 14:
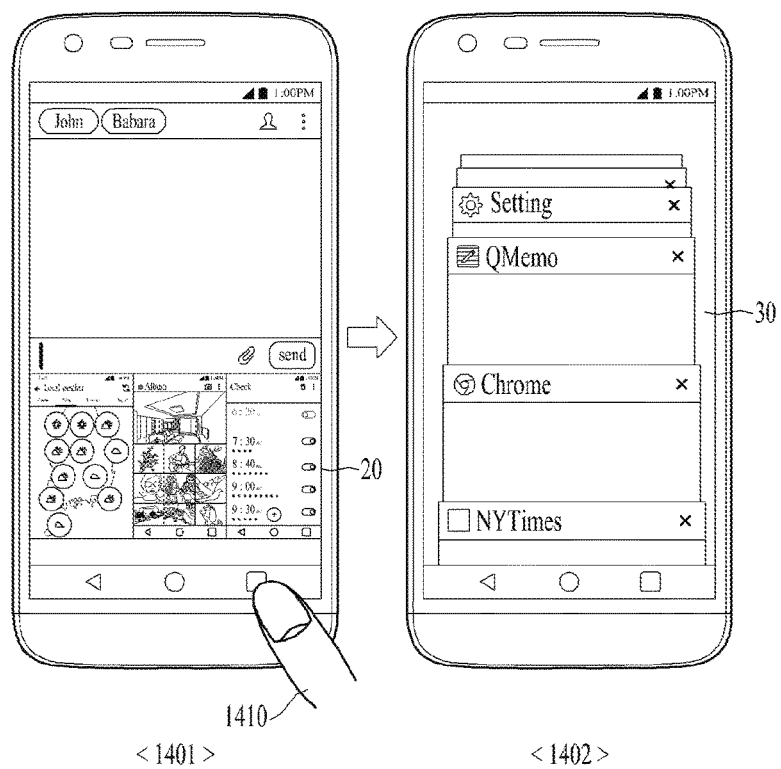
FIG. 14 is a view illustrating another example that a full screen of a recently used list is output in a state that the recently used list is output in an input mode of an application which is being executed in a mobile terminal according to one embodiment of the present invention.

FIG. 14 is a view illustrating another example that a full screen of a recently used list is output in a state that the recently used list is output in an input mode of an application which is being executed in a mobile terminal according to one embodiment of the present invention.

Referring to FIG. <1401>, the mobile terminal may sense an input signal 1410 for the menu button in a state that a first recently used list 20 is output to the input means area. In this case, the first recently used list 20 corresponds to an application list output onto the input means area in a state that the message application is executed as described with reference to FIGS. 6 and 7. Also, the first recently used list may correspond to at least some of the recently used applications. In this case, the input signal 1410 may correspond to intention of the user who desires to use the recently used application list through a full screen.

In this case, as shown in <1402>, the mobile terminal may output a second recently used list 30 onto the display unit. In this case, the second recently used list 30 corresponds to an application list output onto the full screen of the display unit in a state that the message application is not executed. Also, the second recently used list 30 may correspond to at least some of the recently used applications, which are output in the order of use. However, the second recently used list 20 may correspond to an application list output in accordance with the recently used order differently from the first recently used list 20.

Output of Recently Used List on Home Screen

Figure 15:
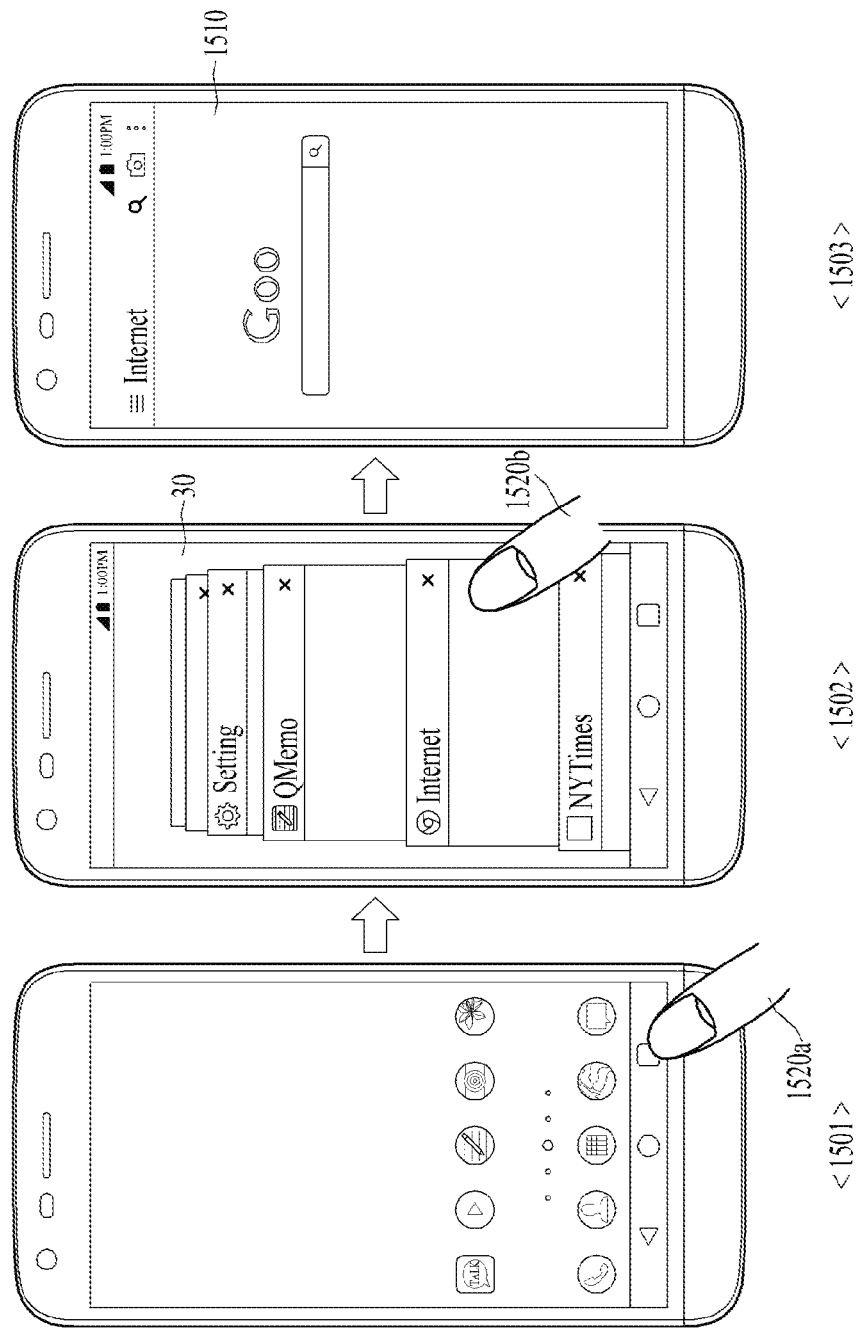
FIG. 15 is a view illustrating an example that a recently used list is output on a home screen of a mobile terminal according to one embodiment of the present invention.

FIG. 15 is a view illustrating an example that a recently used list is output on a home screen of a mobile terminal according to one embodiment of the present invention.

The embodiment of FIG. 15 illustrates a method for outputting a recently used list in a general mobile terminal. For example, if case of a mobile terminal installed with iOS, if a double click input for a home button of the mobile terminal is sensed, the mobile terminal may output a recently used list. Also, in case of a mobile terminal installed with android OS, if a short touch input for a menu button of the mobile terminal is sensed, the mobile terminal may output a recently used list.

In the embodiment of FIG. 15, if a first input signal 1520a for the menu button is sensed in a state that home screen is output, the mobile terminal may output a recently used list 30 on a full screen of the display unit. Also, if a second input signal 1520b for selecting a first list included in the recently used list 20 is sensed, the mobile terminal may output an execution screen 1510 of an application corresponding to the first list onto the display unit.

However, although not shown in FIG. 15, if the first input signal 1520a is a multi-touch and drag touch input, the mobile terminal may provide a screen split view. This will be described again with reference to FIG. 19.

Output of Recently Used List in Non-Input Mode of Application

The method for outputting a recently used list in an input mode of an application has been described with reference to FIGS. 6 to 14, and the method for outputting a recently used list on a home screen not an execution state of an application has been described with reference to FIG. 15. Hereinafter, a method for outputting a recently used list when an execution screen of an application is a non-input mode although the execution screen of the application is output will be described with reference to FIGS. 16 to 22. In this case, the non-input mode may correspond to a state that a text, icon, etc. cannot be input or edited on a screen as an input means such as a keyboard and emoticon is not output unlike FIGS. 6 to 14.

Figure 16:
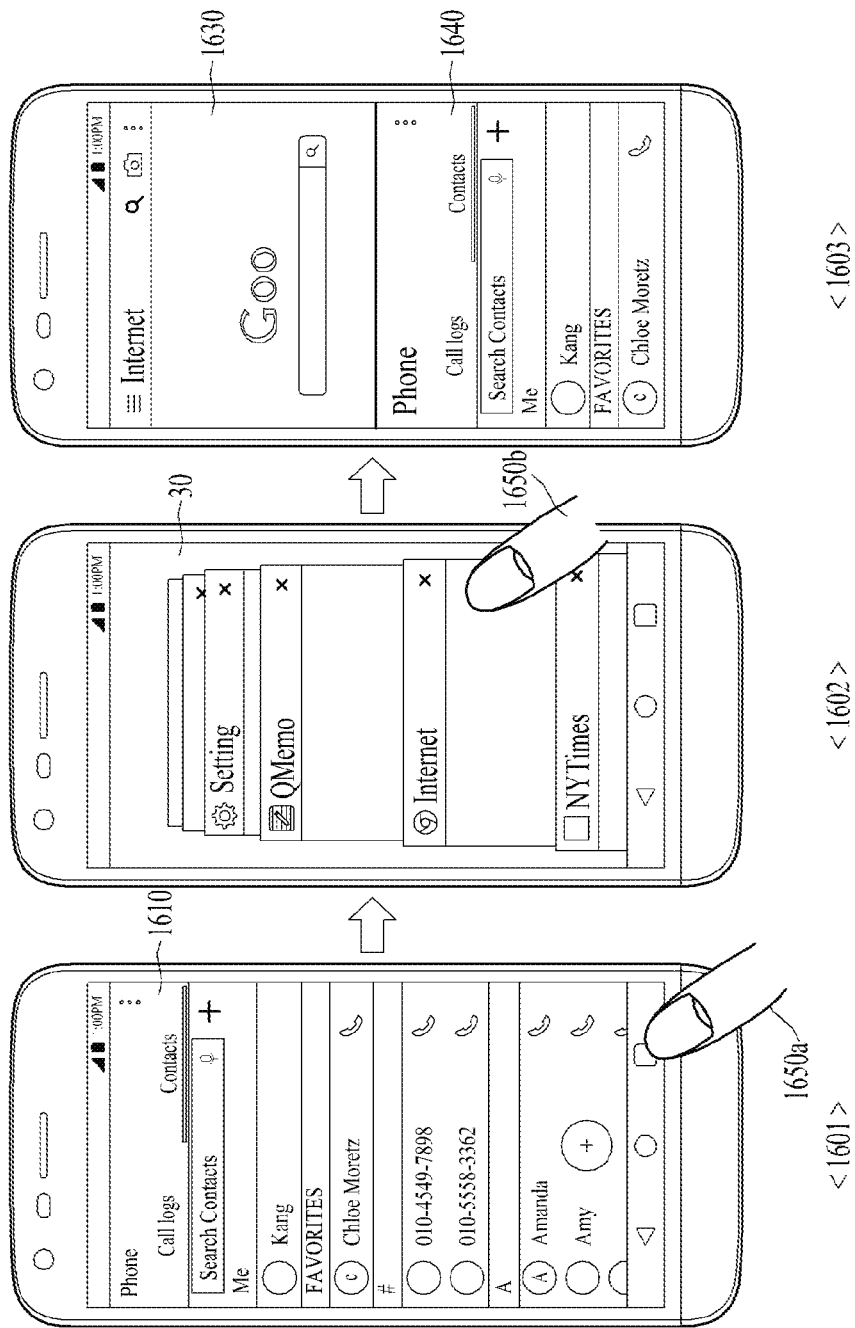
FIG. 16 is a view illustrating an example that screen split is performed in a non-input mode of an application which is being executed in a mobile terminal according to one embodiment of the present invention.

FIG. 16 is a view illustrating an example that screen split is performed in a non-input mode of an application which is being executed in a mobile terminal according to one embodiment of the present invention.

In more detail, FIG. 16 illustrates screen split views of first and second applications if the second application of a recently used list is set in a non-input mode of the first application that is being executed.

In a state that the first application, which is being executed in the mobile terminal, is a non-input mode 1610, the mobile terminal may sense a first input signal 1650a for a menu button. For example, referring to <1601>, in a state that a contact address list is output while a contact address application is being executed, the mobile terminal may sense the first input signal 1650*a* for the menu button. In this case, the first input signal 1650*a* corresponds to, but not limited to, a short touch input. In this case, as shown in <1602>, the mobile terminal may remove the execution screen of the contact address application and output a recently used list 30 on the display unit in response to the first input signal 1650*a*.

Also, the mobile terminal may sense a second input signal 1650*b* for selecting the second application of the recently used list 30. For example, referring to <1602>, the mobile terminal may sense the second input signal 1650*b* for selecting an Internet browsing application of the recently used list 30. In this case, the second input signal 1650*b* corresponds to, but not limited to, a short touch input.

Referring to <1603>, the mobile terminal may perform screen split on the display unit in response to the second input signal 1650*b* to output an execution screen of the second application on a first area 1630 and output an execution screen of the first application on a second area 1640. That is, in the embodiment of FIG. 16 unlike the embodiment of FIG. 15, the application selected from the recently used list may be output simultaneously with the application, which is being executed, through screen split.

In this case, the first application that is being executed may be output to the second area 1640, and the second application newly selected by the user may be output to the first area 1630. This is because that the user may desire to mainly use the application selected through the recently used list if a top one of top and bottom areas is assumed as a main area. However, unlike the embodiment of FIG. 16, the mobile terminal may output the first application to the first area 1340 and output the second application to the second area 1640.

Figure 17:
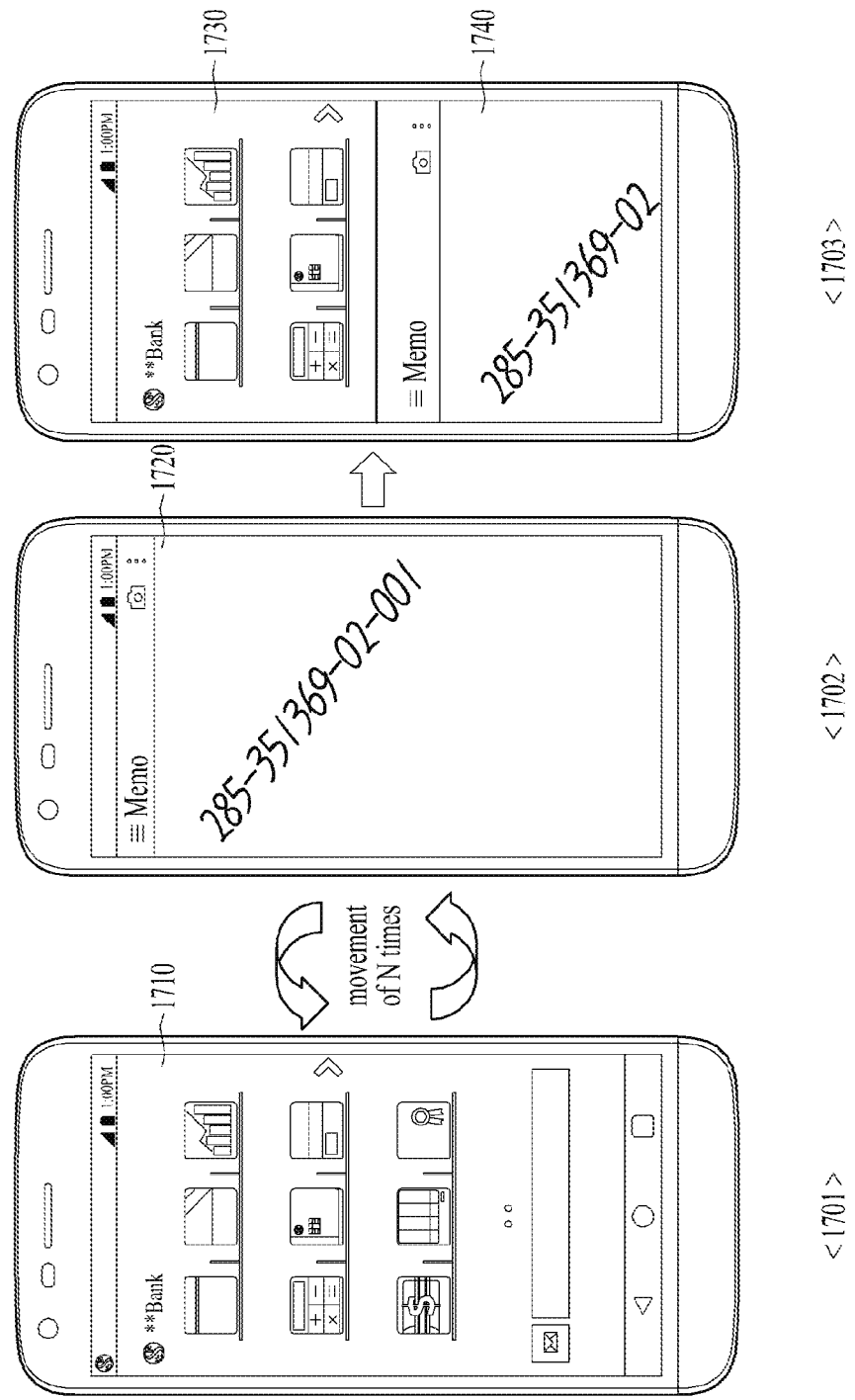
FIG. 17 is a view illustrating another example that screen split is performed in a non-input mode of an application which is being executed in a mobile terminal according to one embodiment of the present invention.

FIG. 17 is a view illustrating another example that screen split is performed in a non-input mode of an application which is being executed in a mobile terminal according to one embodiment of the present invention.

In more detail, FIG. 17 illustrates screen split of first and second applications if each of the first and second applications is output on a display unit through conversion of a plurality of times.

The user may alternately use two applications in the mobile terminal at the same time. For example, this case corresponds to a case where the user refers to a memo application, which includes information such as an account number of the other party, when the user desires to perform account transfer through a bank application. In this case, the user additionally executes the memo application to identify corresponding information by returning to the home screen in a state that the bank application is executed, and then executes the bank application by outputting the recently used list again. If this operation is repeated, the user may feel inconvenience. This embodiment is to suggest a method for solving this problem.

First of all, referring to FIG. <1701>, the mobile terminal may output an execution screen 1710 of the first application on the display unit. Also, although not shown in FIG. 17, the mobile terminal may output the home screen on the display unit in accordance with a control input for selecting a home button. Also, in accordance with a control input for selecting an icon of the second application output to the home screen, as shown in <1702>, the mobile terminal may output an execution screen 1720 of the second application on the display unit.

Also, the mobile terminal may output a recently used list on the display unit in accordance with a control input for selecting a menu button in a state that the execution screen 1720 of the second application is output. Also, in accordance with a control input for selecting the first application included in the recently used list, the mobile terminal may output the execution screen 1710 of the first application.

That is, in accordance with the control input, the mobile terminal may perform screen split for the display unit if the execution screen 1710 of the first application and the execution screen 1720 of the second application are converted to exceed a predetermined number of times. That is, as shown in <1703>, the mobile terminal may output the execution screen of the first application to a first area 1730 and output the execution screen of the second application to a second area 1740 through screen split of the display unit.

For example, the predetermined number of times may correspond to two times. In this case, the mobile terminal may perform screen split if the execution screen 1710 of the first application and the execution screen 1720 of the second application are alternately output onto the display unit two times or more. However, the predetermined number of times is not limited to two times, and may be changed depending on user setup or setup of the mobile terminal.

Also, a ratio of the first area 1730 and the second area 1740 output from a screen split view may be set variously. As an example, a ratio of the screen split view may be determined based on the time when the execution screen 1710 of the first application and the execution screen 1720 of the second application are output. For example, if the execution screen 1710 of the first application and the execution screen 1720 of the second application are output onto the display unit for the same time, the mobile terminal may output the screen split view at 5:5. Also, for example, if the time when the execution screen 1710 of the first application is longer than the time when the execution screen 1720 of the second application is output, the mobile terminal may output the screen split view at 6:4 or 7:3. As another example, the ratio of the screen split view may be determined based on the number of display times of the first application and the second application. Also, as an example, the ratio of the screen split view may be determined based on types of the first application and the second application. This will be described with reference to FIG. 18.

Meanwhile, in the embodiment of FIG. 17, it has been described that the execution screen 1710 of the first application is output to the first area 1730 and the execution screen 1720 of the second application is output to the second area 1740. However, the execution screen 1710 of the first application and the execution screen 1720 of the second application may be output reversely to the embodiment of FIG. 17.

Figure 18:
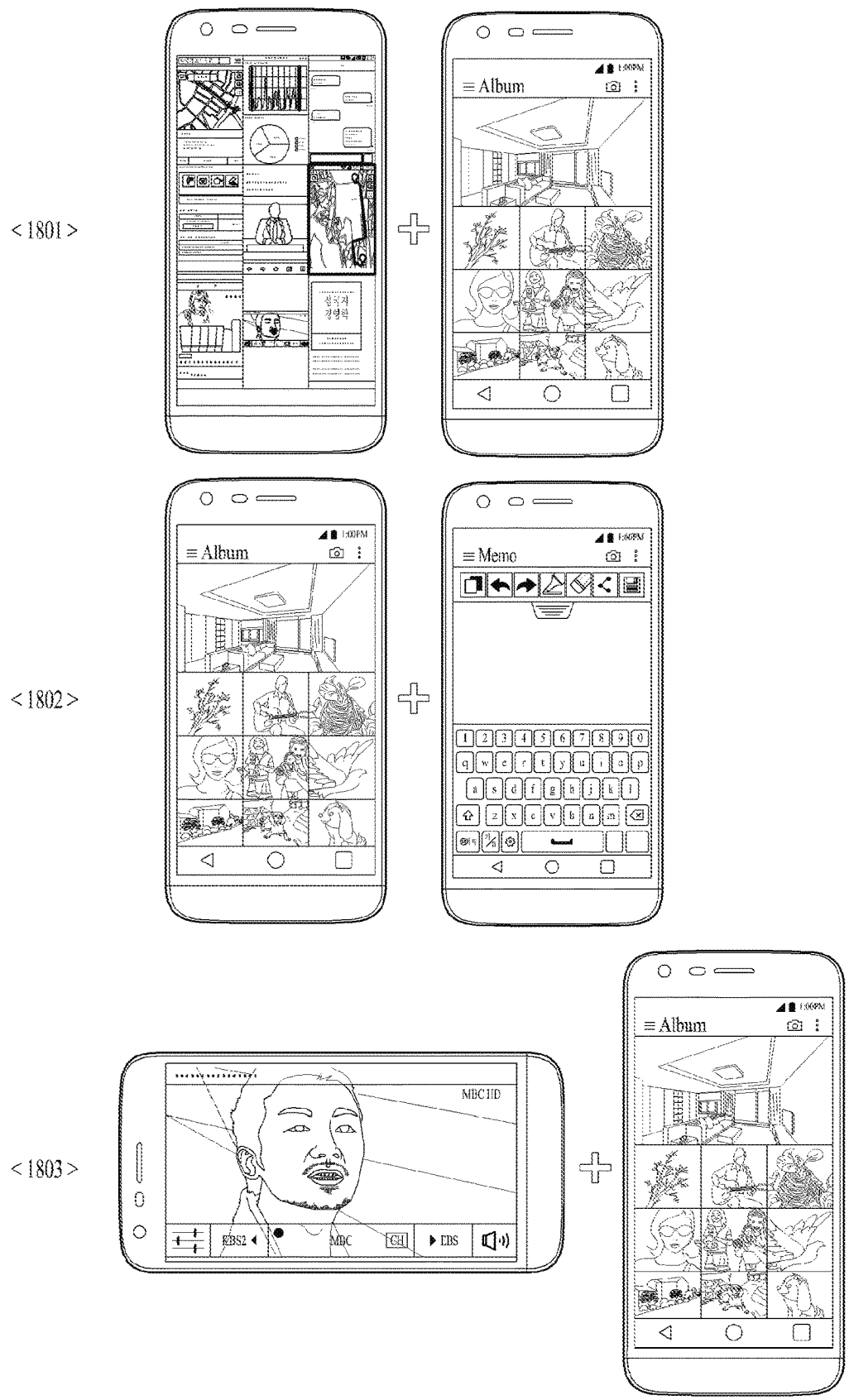
FIG. 18 is a view illustrating an example that a screen split view is output from a mobile terminal according to one embodiment of the present invention.

FIG. 18 is a view illustrating an example that a screen split view is output from a mobile terminal according to one embodiment of the present invention.

In more detail, FIG. 18 illustrates a method for determining a ratio of the first area 1730 and the second area 1740 in the screen split view of FIG. 17 in accordance with types of the application. In the screen split view of the embodiment of FIG. 18, it is assumed that the area to which the execution screen of the first application is output is the first area in FIG. 17, and the area to which the execution screen of the second application is the second area in FIG. 17.

For example, as shown in <1801>, if the first application is a browser application and the second application is a gallery application, the mobile terminal may output the screen split view of the first and second areas at 7:3. Also, for example, as shown in <1802>, if the first application is a gallery application and the second application is a memo application, the mobile terminal may output the screen split view of the first and second areas at 7:3. However, if the memo application is an input mode to which a keyboard is output, not a read mode, the screen split view of the first and second areas may be output at 5:5.

Also, for example, as shown in <1803>, if the first application is a moving picture application and the second application is a gallery application, the mobile terminal may output the screen split view of the first and second areas at 5:5.

Figure 19:
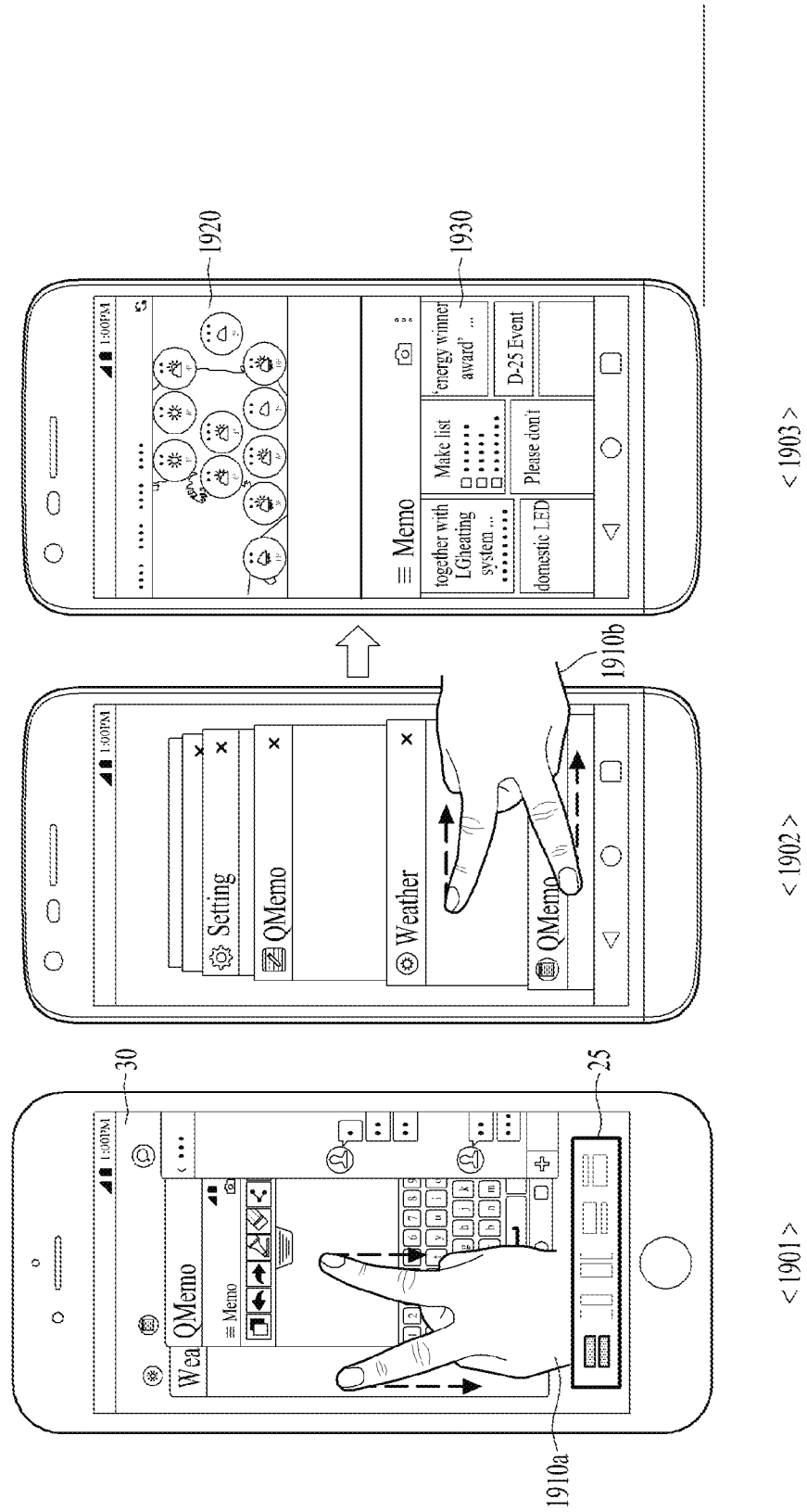
FIG. 19 is a view illustrating another example that screen split is performed in a non-input mode of an application which is being executed in a mobile terminal according to one embodiment of the present invention.

FIG. 19 is a view illustrating another example that screen split is performed in a non-input mode of an application which is being executed in a mobile terminal according to one embodiment of the present invention.

In more detail, FIG. 19 illustrates a method for outputting a screen split view in accordance with an input signal in a state that a recently used list is output to the display unit. Also, in the embodiment of FIG. 19, it is assumed that the recently used list is output from the home screen in the same manner as FIG. 15.

The mobile terminal may output the screen split view in accordance with the input signal for simultaneously selecting the first application and the second application included in the recently used lit in a state that the recently used list is output. In this case, the input signal may correspond to a multi-touch and drag (flicking) touch input.

As an example, in case of <1901>, if a plurality of applications included in the recently used lit are output horizontally, the mobile terminal may sense a drag (flicking) touch input for touching the first application and the second application in a downward direction at the same time. In this case, as shown in <1903>, the mobile terminal may provide a screen split view for outputting the first application to a first area 1920 and outputting the second application to a second area 1930.

As another example, in case of <1902>, if a plurality of applications included in the recently used lit are output vertically, the mobile terminal may sense a drag (flicking) touch input for touching the first application and the second application in a right direction or left direction at the same time. In this case, as shown in <1903>, the mobile terminal may provide a screen split view for outputting the first application to the first area 1920 and outputting the second application to the second area 1930.

Figure 20:
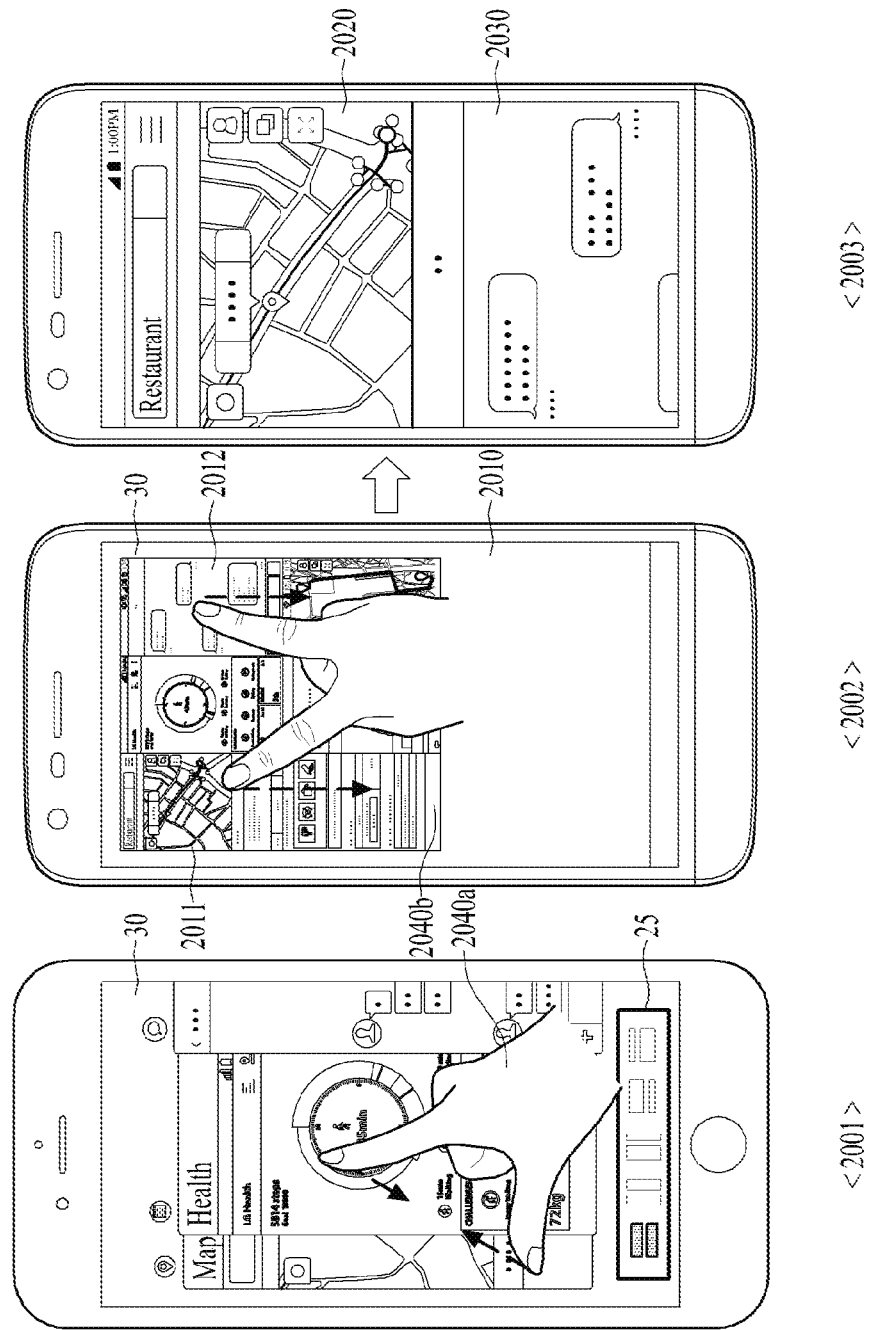
FIG. 20 is a view illustrating still another example that screen split is performed in a non-input mode of an application which is being executed in a mobile terminal according to one embodiment of the present invention.

FIG. 20 is a view illustrating still another example that screen split is performed in a non-input mode of an application which is being executed in a mobile terminal according to one embodiment of the present invention.

In more detail, FIG. 20 illustrates a method for outputting a screen split view in accordance with an input signal in a state that a recently used list is output to the display unit. Also, in the embodiment of FIG. 20, it is assumed that the recently used list is output from the home screen in the same manner as FIG. 15.

Referring to <2001>, the mobile terminal may sense a first input signal 2040a in a state that the recently used list is output. In this case, the first input signal 2040a may correspond to a pinch-in touch input. For example, as shown in <2001>, some of the recently used list may be output to the display unit. Also, the user may desire to use the application, which is not included in the recently used list output to the display unit, through the screen split view.

In this case, as shown in <2002>, the mobile terminal may output a full list 2010 of the recently used lit in response to the first input signal 2040a. In this case, the user may desire to use a plurality of desired applications of the full list 2010 through the screen split view. That is, the mobile terminal may sense a drag (flicking) touch input by selecting a first application 2011 and a second application 2012 of the full list 2010.

Also, as shown in <2003>, the mobile terminal may provide a screen split view for outputting the first application selected by the user to a first area 2020 and outputting the second application to a second area 2030. As a result, the user may easily use the plurality of applications, which do not adjoin the recently used list, through the screen split view in addition to the embodiment of FIG. 19, which provides the plurality of applications adjacent to the recently used list through the screen split view.

Figure 21:
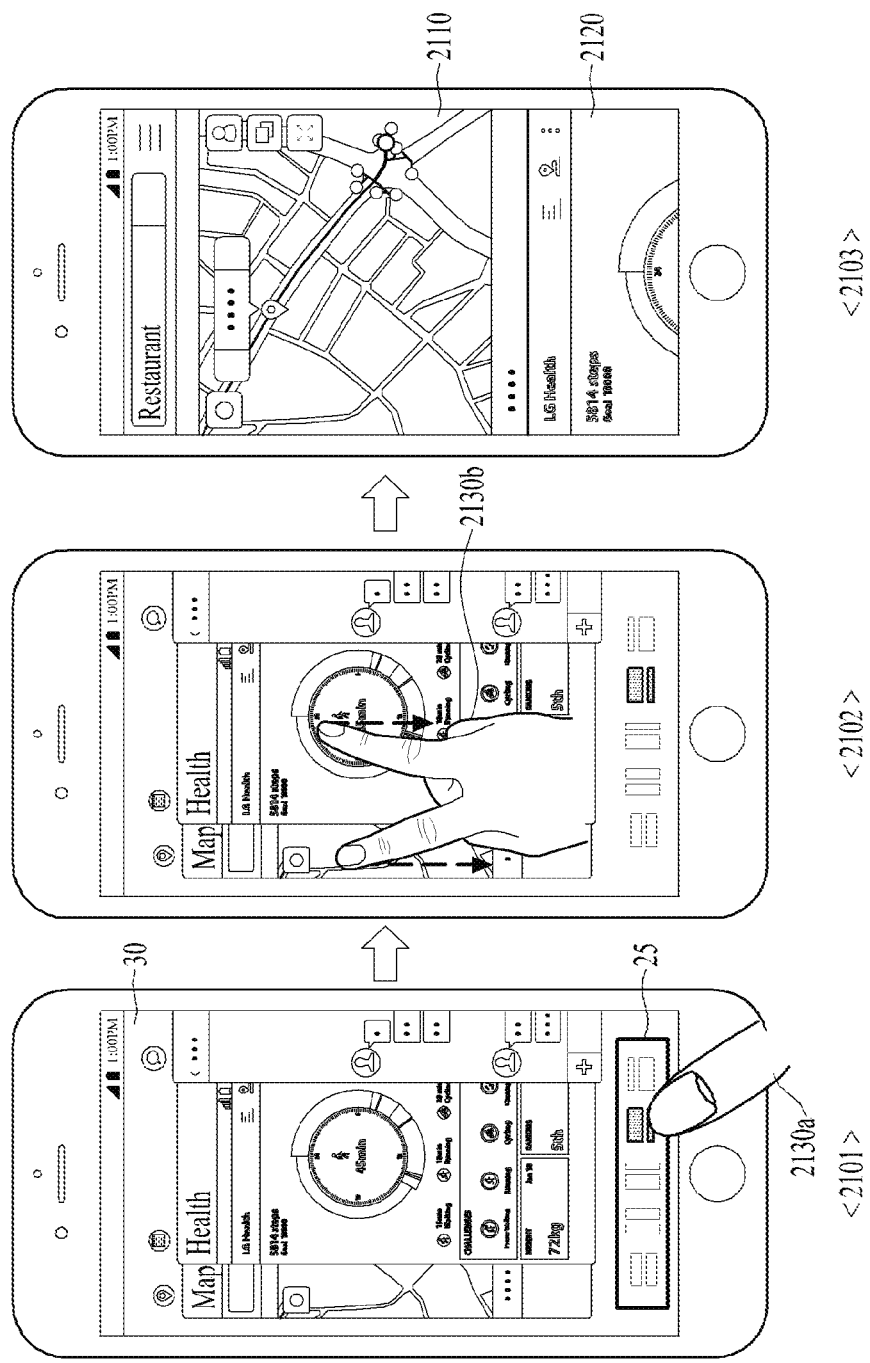
FIG. 21 is a view illustrating further still another example that screen split is performed in a non-input mode of an application which is being executed in a mobile terminal according to one embodiment of the present invention.

FIG. 21 is a view illustrating further still another example that screen split is performed in a non-input mode of an application which is being executed in a mobile terminal according to one embodiment of the present invention.

In more detail, FIG. 21 illustrates a method for providing a screen split view through a plurality of applications in a state that a screen split type is selected. Also, in the embodiment of FIG. 21, it is assumed that the recently used list is output from the home screen in the same manner as FIG. 15.

Referring to <2001>, the mobile terminal may output a screen split setup area 25 to a lower end of the display unit in a state that the recently used list is output. The screen split setup area 25 corresponds to an area where a ratio of an execution screen of each of a plurality of applications, which is reserved in the display unit, is determined if a screen split view of the execution screens of the plurality of applications is provided. For example, the screen split setup area 25 may be indicated in various forms such as figure, number and text. In the embodiment of FIG. 21, the screen split setup area 25 is shown in the form of figure, and corresponds to up and down 5:5 split, left and right 5:5 split, left and right 7:3 split, up and down 7:3 split, and up and down 3:7 split, from a left side to a right side.

The screen split setup area 25 may be set to the up and down 5:5 split as a basic setup during output. For example, although not shown in <2101>, if the recently used list 30 is output, the mobile terminal may highlight the up and down 5:5 split area of the screen split setup area 25. However, if the user desires another screen split, as shown in <2101>, the mobile terminal may sense a first input signal 2130a for the screen split setup area 25. In this case, the first input signal 2130a may correspond to a single tap touch input for the up and down 7:3 split area include in the screen split setup area 25.

In this case, as shown in <2001>, the mobile terminal may highlight an area where the first input signal 2130a is sensed in the screen split setup area 25. Also, after the screen split setup is completed, the mobile terminal may sense a second input signal 2130b for the recently used list 30. In this case, referring to <2102>, the second input signal 2130b is an input for selecting a plurality of applications of the recently used list 30 and may correspond to a drag (flicking) touch in a multi-touch and downward direction.

The mobile terminal may provide a screen split view based on the first input signal 2130a and the second input signal 2130h. In more detail, the mobile terminal may output the screen split view by setting the up and down 7:3 split in accordance with the first input signal 2130a and setting the first and second applications in accordance with the second input signal 2130b. Referring to <2103>, the mobile terminal may output the first application, that is, a map application, to a first area 2110 corresponding to an upper end of the display unit and output the second application, that is, a health application, to a second area 2120 corresponding to a lower end of the display unit. Also, the first area 2110 and the second area 2120 may be split at a ratio of 7:3.

Meanwhile, although not shown in FIG. 21, if the second input signal 2130*b* is a single touch and drag input not a multi-touch, the mobile terminal may provide one application of the recently used list as a full screen not a screen split view. Also, the second input signal 2130*b* is sensed without the first input signal 2130*a*, as described with reference to FIG. 19, the mobile terminal may provide the execution screens of the first application and the second application at a ratio of 5:5.

Figure 22:
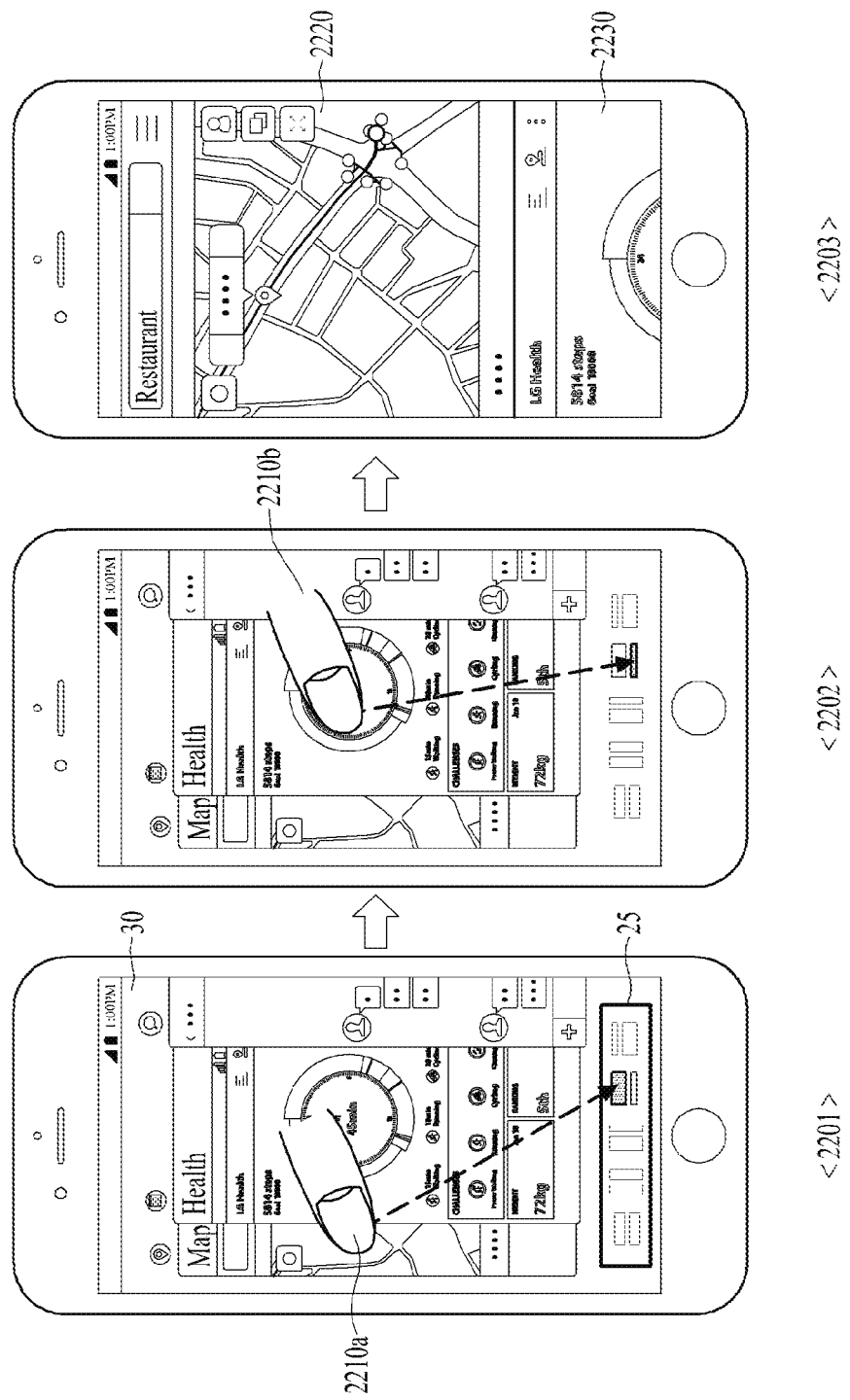
FIG. 22 is a view illustrating further still another example that screen split is performed in a non-input mode of an application which is being executed in a mobile terminal according to one embodiment of the present invention.

FIG. 22 is a view illustrating further still another example that screen split is performed in a non-input mode of an application which is being executed in a mobile terminal according to one embodiment of the present invention.

In more detail, FIG. 22 illustrates a method for providing a screen split view based on a plurality of applications in a state that a screen split type is not selected differently from FIG. 21. Repeated description of FIG. 21 will be omitted in the description of FIG. 22. Also, in the embodiment of FIG. 22, it is assumed that the recently used list is output from the home screen in the same manner as FIG. 15.

If the recently used list 30 is output, the mobile terminal may output the screen split setup area 25 to the lower end of the display unit together with the recently used list 30. Also, as shown in <2101>, the mobile terminal may sense a first input signal 2210*a* for the first application included in the recently used list 30. In this case, the first input signal 2210*a* is a touch and drag input, and its start point may correspond to a position of the first application and its end point may correspond to the up and down 7:3 split area of the screen split setup area 25.

Next, as shown in <2102>, the mobile terminal may sense a second input signal 2210*b* for the second application included in the recently used list 30. In this case, the second input signal 2210*b* is a touch and drag input, and its start point may correspond to a position of the first application and its end point may correspond to the up and down 7:3 split area of the screen split setup area 25.

In this case, the mobile terminal may provide a screen split view based on the first input signal 2210*a* and the second input signal 2210*b*. In more detail, in accordance with the first input signal 2210*a*, the mobile terminal may set the up and down 7:3 split in the screen split setup area 25, and may set an application output to a first area 2220. Also, in accordance with the second input signal 2210*b*, the mobile terminal may set an application output to a second area 2230.

Control of Type Output from Screen Split View

In a state that the screen split view is output through FIGS. 6 to 22, the user may control a size of an application output to the screen split view or perform additional control such as location change. Hereinafter, a method for controlling an area output from a screen split view will be described with reference to FIGS. 22 and 23.

Figure 23:
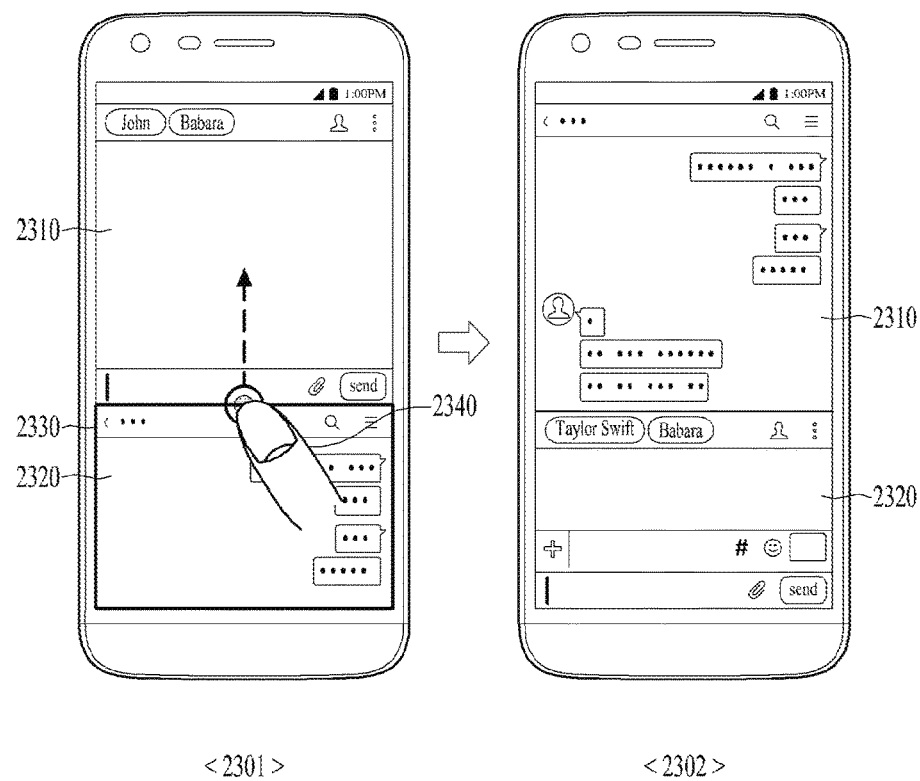
FIG. 23 is a view illustrating an example that a size per area is controlled in a screen split view of a mobile terminal according to one embodiment of the present invention.

FIG. 23 is a view illustrating an example that a size per area is controlled in a screen split view of a mobile terminal according to one embodiment of the present invention.

Referring to <2301>, the mobile terminal may output an execution screen of a first application to a first area 2310 of the display unit and output an execution screen of a second application to a second area 2320. In this regard, it is assumed that screen split is performed in accordance with the method described with reference to FIGS. 6 to 22. Also, in the embodiment of FIG. 23, it is assumed that a screen split ratio of the first area 2310 and the second area 2320 is 6:4 up and down. Also, it is assumed that the first area 2310 is a main area.

The user may desire to use the second application not the first application output to the main area while using the first application and the second application at the same time. At this time, as shown in <2301>, the mobile terminal may sense an input signal 2340 for an edge of the second area. In this case, the input signal 2340 may correspond to a continuous input of a long touch and upward drag touch.

In more detail, the mobile terminal may output an indicator 2330 to the edge of the second area 2320 in accordance with a long touch of the input signal 2340. In this case, the indicator 2330 may indicate that a size of the second area 2320 can be edited. Also, the mobile terminal may determine downsizing or area conversion of the second area 2320 in accordance with a drag touch of the input signal 2340.

As an example, if a moving distance of the drag touch input is smaller than a predetermined distance, the mobile terminal may downsize the size of the first area 2310 and enlarge the size of the second area 2320 in proportion to the drag touch. In this case, although not shown in FIG. 23, the mobile terminal may output the first area 2310 and the second area 2320 by controlling at a ratio of 5:5 up and down in accordance with the input signal 2340.

As another example, if the moving distance of the drag touch input exceeds a predetermined distance, the mobile terminal may convert the execution screen of the application output to the first area 2310 and the second area 2320. In this case, as shown in <2302>, the mobile terminal may output locations of the execution screen of the first application and the execution screen of the second application. That is, the execution screen of the second application may be output to the main area.

Figure 24:
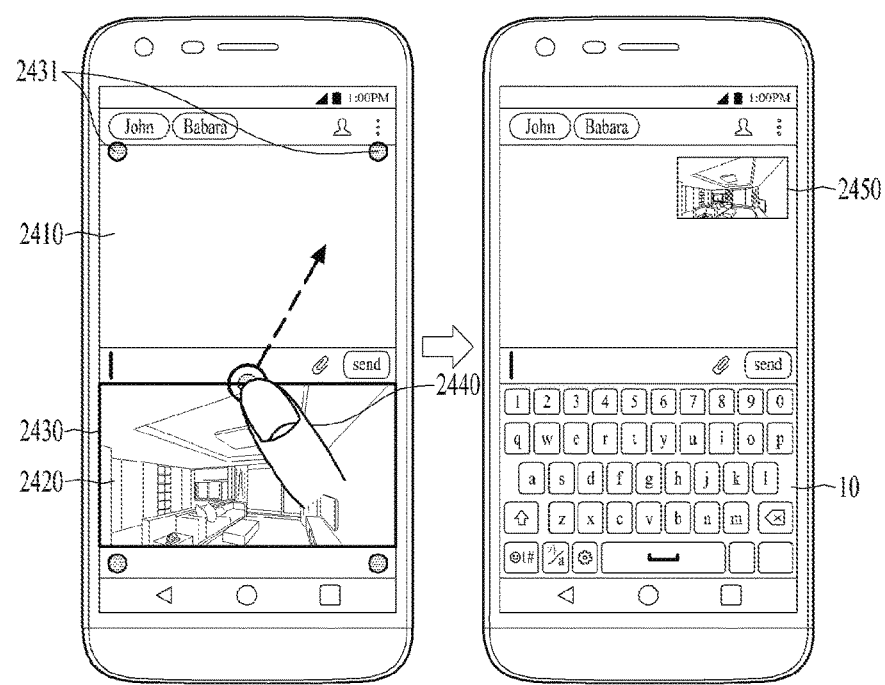
FIG. 24 is a view illustrating another example that a size per area is controlled in a screen split view of a mobile terminal according to one embodiment of the present invention.

FIG. 24 is a view illustrating another example that a size per area is controlled in a screen split view of a mobile terminal according to one embodiment of the present invention.

In more detail, the embodiment of FIG. 24 illustrates a method for converting an execution screen of an application output to a second area in a picture-in-picture (PIP) mode unlike FIG. 23. In the embodiment of FIG. 24, repeated description of FIG. 23 will be omitted.

The user may desire to use the first application as a full screen by outputting the second application, which is output to a second area 2420 corresponding to a sub area, in a smaller size while using the first application and the second application at the same time. At this time, as shown in <2401>, the mobile terminal may sense an input signal 2440 for an edge of the second area. In this case, the input signal 2440 may correspond to a continuous input of a long touch and upward drag touch.

In more detail, the mobile terminal may output an indicator 2430 to the edge of the second area 2420 in accordance with a long touch of the input signal 2440. Also, the mobile terminal may determine a location to which the second area 420 is output in a PIP mode, in accordance with the drag touch of the input signal 2440. Also, if the drag touch of the input signal 2440 starts, the mobile terminal may additionally output an apex position indicator 2431 of the display unit. In this case, the apex position indicator 2431 recommends a location to which a PIP area is output, and may be arranged on an apex of the edge of the display unit.

As an example, if a direction of a drag touch input corresponds to a right side on the upper end of the display unit, the mobile terminal may remove the second area 2320 from the display unit and output the PIP area 2450 corresponding to the second area 2320 onto the upper end of the display unit. As a result, the user may use the execution screen of the first application as a full screen of the display unit while identifying the execution screen of the second application.

Figure 25:
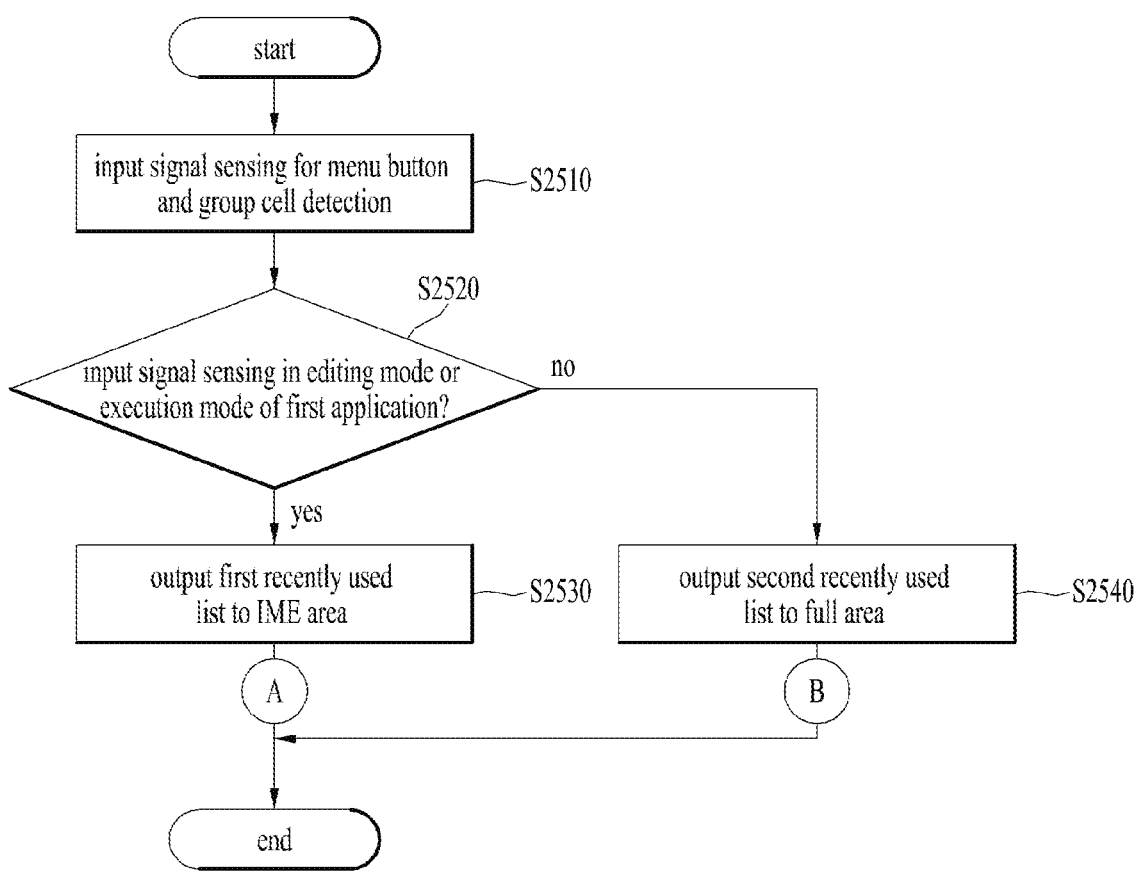
FIG. 25 is a flow chart illustrating a method for controlling a mobile terminal according to one embodiment of the present invention.

FIG. 25 is a flow chart illustrating a method for controlling a mobile terminal according to one embodiment of the present invention.

The mobile terminal may sense an input signal for a menu button (S2510). As described above, the menu button may correspond to one of basic tool buttons provided in the mobile terminal.

In this case, the mobile terminal may determine whether the input signal for the menu button has been sensed in an input mode of a first application (S2520). At the step S2520, if the mobile terminal is executing the first application and is in the input mode of the first application, the mobile terminal may output a first recently used list to a corresponding location of an input means area (S2530). In this regard, as described with reference to FIG. 6, the mobile terminal may output only some of a plurality of recently used lists as the first recently used list. This will be described again with reference to FIG. 26.

At the step S2520, the mobile terminal may output a second recently used list onto the display unit if the mobile terminal is not in the input mode of the first application (S2540). This will be described again with reference to FIG. 27. Meanwhile, the first recently used list and the second recently used list have the same meta data but their output types may be different from each other.

Figure 26:
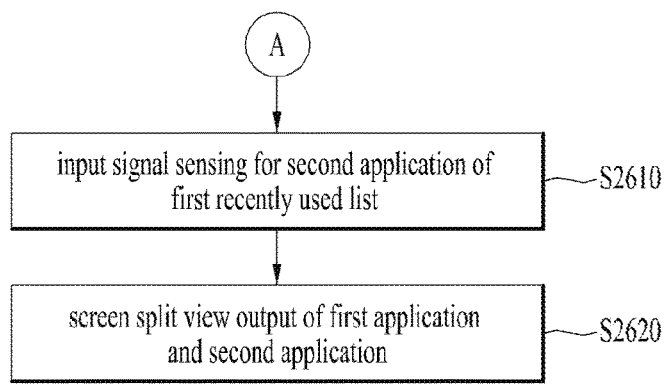
FIG. 26 is a flow chart illustrating another method for controlling a mobile terminal according to one embodiment of the present invention.

FIG. 26 is a flow chart illustrating another method for controlling a mobile terminal according to one embodiment of the present invention.

First of all, as described with reference to FIG. 25, if the mobile terminal is executing the first application and is in the input mode, the mobile terminal may output a first recently used list to a corresponding location of an input means area in accordance with an input signal for a menu button.

Next, the mobile terminal may sense an input signal for the second application of the first recently used list (S2610).

In this case, the mobile terminal may output a screen split view of the first application and the second application in response to the input signal (S2620).

Figure 27:
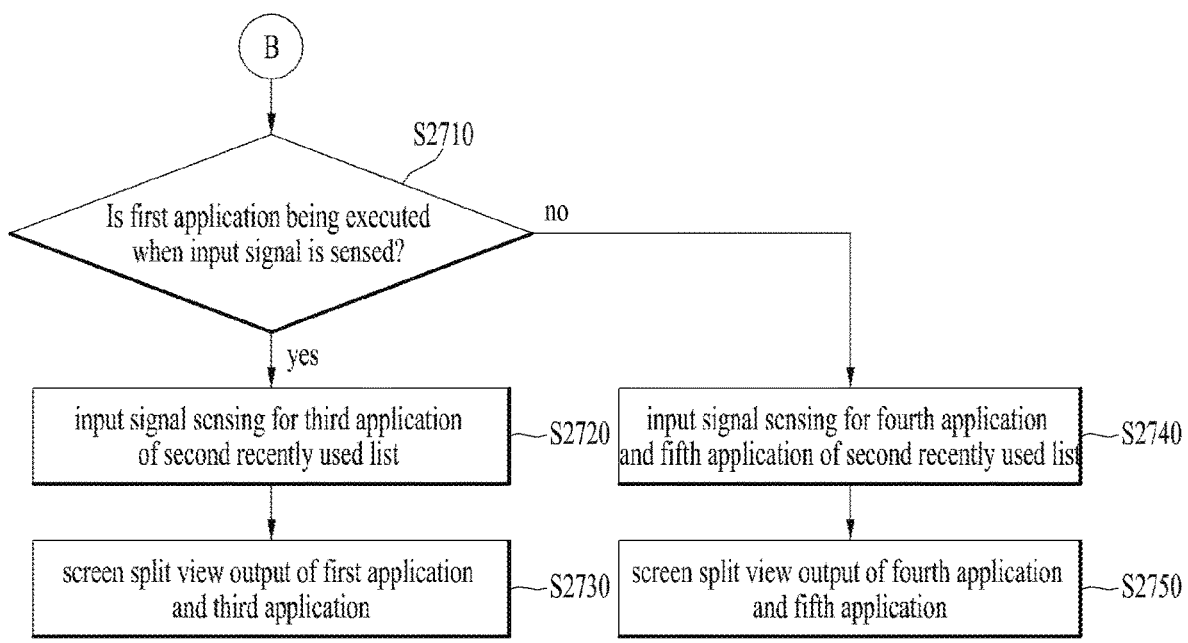
FIG. 27 is a flow chart illustrating other method for controlling a mobile terminal according to one embodiment of the present invention.

FIG. 27 is a flow chart illustrating other method for controlling a mobile terminal according to one embodiment of the present invention.

First of all, as described with reference to FIG. 25, if the mobile terminal is not in the input mode of the first application, the mobile terminal may output a second recently used list onto the display unit as a full screen in accordance with an input signal for a menu button.

At this time, the mobile terminal may determine whether the first application is being executed at the time when the input signal for the menu button is sensed (S2710). At the step S2710, if the first application is being executed, the mobile terminal may sense an input signal for the third application of the second recently used list (S2720).

In this case, the mobile terminal may output a screen split view of the first application and the third application (S2730). In this case, the third application may correspond to an application the same as or different from the second application of FIG. 26.

Meanwhile, at the step S2710, if the first application is not being executed, that is, in case of a home screen, the mobile terminal may sense input signals for the fourth application and the fifth application of the second recently used list (S2740). In this case, as described with reference to FIG. 19, the input signal may correspond to a multi-touch and drag touch.

In this case, the mobile terminal may output a screen split view of the fourth application and the fifth application in response to the input signal (S2750). In this case, the fourth application or the fifth application may correspond to an application the same as or different from the second application or the third application described with reference to FIGS. 25 and 26.

According to at least one of the embodiments of the present invention, it is advantageous that fast and exact multi-tasking may be realized to quickly provide a function desired by the user.

Also, according to at least one of the embodiments of the present invention, it is advantageous that screen split and multi-tasking may be provided by analyzing use behavior and intention of the user.

Also, according to at least one of the embodiments of the present invention, it is advantageous that various screen split views may be provided depending on whether the use aspect of the application is the input mode or non-input mode.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
   a display;
   a sensing unit; and
   a controller configured to:
   cause the display to display a keyboard in an input area during an input mode of a first application being executed;
   in response to a first input received when the keyboard is displayed in the input area, cause the display to display a first recently used application list together with a first execution screen of the first application, the first recently used application list including at least one recently used application, such that the keyboard is replaced with the first recently used application list in the input area;

in response to a second input for selecting a second application from the first recently used application list, cause the display to display an second execution screen of the second application together with the first execution screen of the first application in a first screen split view, such that the first execution screen of the first application is displayed at a first portion of the display and the second execution screen of the second application is displayed at a second portion of the display; and in response to a third input received when the first recently used application list is displayed together with the first execution screen of the first application, cause the display to display a second recently used application list including at least two recently used applications, such that both the first recently used application list and the first execution screen of the first application are replaced with the second recently used application list, wherein the controller is further configured to:

in response to a fourth input received when a home screen is displayed, cause the display to display the second recently used application list instead of the home screen; and cause the display to generate a second screen split view such that a third execution screen of a third application and a fourth execution screen of a fourth application are displayed in response to a fifth input for selecting the third application and the fourth application from the second recently used application list.

2. The mobile terminal according to claim 1, wherein the at least two recently used applications of the second recently used application list are displayed in order of use.

3. The mobile terminal according to claim 1, wherein the controller is further configured to cause the display to generate the first screen split view such that the first execution screen of the first application and the second execution screen of the second application are displayed at a same time in response to the second input for selecting the second application from the first recently used application list.

4. The mobile terminal according to claim 1, wherein the controller is further configured to cause the display to display a screen split setup area indicating a screen split ratio when the second screen split view is generated such that the third execution screen of the third application and the fourth execution screen of the fourth application are displayed according to the screen split ratio set via the screen split setup area.

5. The mobile terminal according to claim 1, wherein:

the first recently used application list includes a predetermined number of applications including the at least two recently used applications included in the second recently used application list; and the predetermined number of applications are aligned in accordance with a predetermined reference.

6. The mobile terminal according to claim 5, wherein the predetermined reference includes at least one of a priority set by a user, a recently used frequency, or correlation with the first application.

7. The mobile terminal according to claim 1, wherein the controller is further configured to cause the display to stop the displaying of the first recently used application list in response to the second input such that the first recently used application list is replaced with the second execution screen of the second application at the second portion.

8. The mobile terminal according to claim 7, wherein the controller is further configured to:

enlarge a size of the first portion and decrease a size of the second portion in response to a sixth input received at an edge area of the first portion when a moving length of the sixth input is within a predetermined length; and switch between the first execution screen of the first application and the second execution screen of the second application when the moving length of the sixth input signal exceeds the predetermined length such that the first execution screen of the first application is displayed at the second portion and the second execution screen of the second application is displayed at the first portion.

9. The mobile terminal according to claim 8, wherein the controller is further configured to cause the display to display the second execution screen of the second application in a picture-in-picture (PIP) area in response to a seventh input received at an edge area of the second portion, wherein the seventh input is received while the first execution screen of the first application is displayed at the first portion and the second execution screen of the second application is displayed at the second portion, and wherein a location of the PIP area is determined based on an end point of the seventh input that is moved from the edge area of the second portion to the end point.

10. The mobile terminal according to claim 9, wherein the sixth input and the seventh input are drag touch inputs of which directions are different from each other.

11. The mobile terminal according to claim 1, wherein:

the keyboard is no longer displayed in the input area when the keyboard is replaced with the first recently used application list in the input area in response to the first input; and the first recently used application list and the first execution screen are no longer displayed when both the first recently used application list and the first execution screen of the first application are replaced with the second recently used application list in response to the third input.

12. The mobile terminal according to claim 1, wherein the first input is received via a menu button or a home button.

13. A method for controlling a mobile terminal, the method comprising:

displaying a keyboard in an input area during an input mode of a first application being executed;

sensing a first input received while the keyboard is displayed in the input area;

displaying a first recently used application list together with a first execution screen of the first application, the first recently used application list including at least one recently used application, such that the keyboard is replaced with the first recently used application list in the input area;

sensing a second input received for selecting a second application from the first recently used application list;

displaying a second execution screen of the second application together with the first execution screen of the first application in a first screen split view, such that the first execution screen of the first application is displayed at a first portion of the display and the second execution screen of the second application is displayed at a second portion of the display; and in response to a third input received when the first recently used application list is displayed together with the first execution screen of the first application, displaying a second recently used application list including at least two recently used applications, such that both the first recently used application list and the first execution screen of the first application are replaced with the second recently used application list, wherein the method further comprises:

in response to a fourth input received when a home screen is displayed, displaying a second recently used application list instead of the home screen; and generating a second screen split view such that a third execution screen of a third application and a fourth execution screen of a fourth application are displayed in response to a fifth input for selecting the third application and the fourth application from the second recently used application list.

14. The method according to claim 13, wherein the at least two recently used applications of the second recently used application list are displayed in order of use.

15. The method according to claim 13, further comprising generating the first screen split view such that the first execution screen of the first application and the second execution screen of the second application are displayed at a same time in response to the second input for selecting the second application from the second recently used application list.

16. The method according to claim 13, further comprising displaying a screen split setup area indicating a screen split ratio when the second screen split view is generated such that the third execution screen of the third application and the fourth execution screen of the fourth application are displayed according to the screen split ratio set via the screen split setup area.

17. The method according to claim 13, wherein:

the first recently used application list includes a predetermined number of applications including the at least two recently used applications included in the second recently used application list; and the predetermined number of applications are aligned in accordance with a predetermined reference.

18. The method according to claim 17, wherein the predetermined reference includes at least one of a priority set by a user, a recently used frequency, or correlation with the first application.

* * * * *